United States Patent
Greenland et al.

[11] Patent Number: 5,492,715
[45] Date of Patent: Feb. 20, 1996

[54] DUAL FUNCTION FRUIT CONCENTRATE SWEETENER AND FAT SUBSTITUTE AND METHOD OF MAKING

[76] Inventors: Frederick A. Greenland, 403 Rosedale Ct., Capitola, Calif. 95010; Robert J. Lynch, III, 445 Vick Dr., Santa Cruz, Calif. 95060; Cheryl R. Mitchell; Pat R. Mitchell, both of 4844 E. Morada La., Stockton, Calif. 95212; Thomas R. Myers, 45 Hudson St., Redwood City, Calif. 94062

[21] Appl. No.: 222,291

[22] Filed: Mar. 31, 1994

[51] Int. Cl.⁶ .................................................. A23L 1/222
[52] U.S. Cl. ........................... 426/658; 426/599; 426/661
[58] Field of Search ................................... 426/658, 661, 426/599

[56] References Cited

U.S. PATENT DOCUMENTS

| | | | |
|---|---|---|---|
| 4,282,262 | 8/1981 | Blake | 426/565 |
| 4,293,577 | 10/1981 | Cillario | 426/244 |
| 4,394,392 | 7/1983 | Tresser | 426/101 |
| 4,564,525 | 1/1986 | Mitchell et al. | 426/104 |
| 4,663,176 | 5/1987 | Arden | 426/565 |
| 4,744,992 | 5/1988 | Mitchell et al. | 426/29 |
| 4,756,912 | 7/1988 | Mitchell et al. | 4236/28 |
| 4,873,112 | 10/1989 | Mitchell et al. | 426/599 |
| 4,876,096 | 10/1989 | Mitchell et al. | 426/28 |
| 4,888,195 | 12/1989 | Huhn et al. | 426/601 |
| 4,894,242 | 1/1990 | Mitchell et al. | 426/29 |
| 4,911,946 | 3/1990 | Singer et al. | 426/658 |
| 4,919,964 | 4/1990 | Adams et al. | 426/564 |
| 4,973,489 | 11/1990 | Meyer et al. | 426/611 |
| 5,006,360 | 4/1991 | Howard et al. | 426/601 |
| 5,077,073 | 12/1991 | Ennis et al. | 426/531 |
| 5,104,674 | 4/1992 | Chen et al. | 426/573 |
| 5,143,741 | 9/1992 | Podolski et al. | 426/565 |
| 5,250,306 | 10/1993 | McCleary et al. | 426/52 |
| 5,262,187 | 11/1993 | Hahn | 426/391 |

OTHER PUBLICATIONS

"Corn Syrups and Sugar" 1958, pp. 18–19.
Kuntz, L. A., "Fruit Applications: From Down on the Farm to Up on the Shelf", *Food Product Design*, pp. 24–41 (Dec. 1992).

*Primary Examiner*—Donald E. Czaa
*Assistant Examiner*—Lien Tran
*Attorney, Agent, or Firm*—John A. Bucher; Robert Charles Hill

[57] ABSTRACT

A fruit concentrate composition is blended from a hydrolyzed starch of at least 40 D.E., preferably about 50–70 D.E., more preferably about 55–65 D.E. and a fruit concentrate having about 0% insoluble solids, the blended composition having at least about 70%, preferably about 80–95%, more preferably about 90–95% simple carbohydrates, and about 3–20%, preferably about 3–10%, more preferably about 6% complex carbohydrates, on a dry weight basis, with a resulting dual functionality in food formulations for achieving both nutritive sweetening and fat substitution as well as a number of other benefits. The composition is preferably formed by hydrolyzing a starch source to the above D.E. value, blending it with a fruit juice concentrate to form a fruit concentration composition having the above components and reducing water content of the blend to at least about 77%, preferably to about 77–80% soluble solids, the composition having substantially 0% insoluble solids. The simple carbohydrates in the composition are preferably selected from the class consisting of glucose, maltose, fructose, sucrose, lactose, sorbitol and combinations thereof, the complex carbohydrates comprising one or more dextrins, the simple carbohydrates preferably including at least one component exhibiting humectancy or hygroscopicity. Food/beverage products are formed with the composition to take advantage of its multi-functionality, the composition preferably simultaneously sweetening the products and replacing some or at least about 25% or 50% or even substantially all normal fat components in the products.

68 Claims, No Drawings

DUAL FUNCTION FRUIT CONCENTRATE SWEETENER AND FAT SUBSTITUTE AND METHOD OF MAKING

FIELD OF THE INVENTION

The present invention relates to a multi-function sweetener composition and method of production and more particularly to such a composition having dual functionality of simultaneously sweetening and replacing fats in food/beverage products.

BACKGROUND OF THE INVENTION

Numerous sweetener compositions have been disclosed in the prior art for various food/beverage products. In addition, the prior art has also disclosed numerous products acting as fat replacements or substitutes in various food/beverage products either in combination with sweeteners of the type referred to above or separately. The prior art in these two areas is discussed below in order to assure a more complete understanding of the present invention. The following discussion deals first with various sweeteners in food/beverage products followed by a discussion of products contemplated for fat substitution or replacement in food/beverage products.

Initially, in the area of sweetener compositions, significant controversy has developed over the possible deleterious effects of large amounts of sucrose, synthetic sweeteners and refined sugars or simple carbohydrates (DP 1 and DF 2) in the human diet. The United States and Europe have recommended modifications in the diet which include a decrease in the uptake of simple carbohydrates, and an increase in complex carbohydrates (DP 3 and greater).

It has also been recommended that sucrose consumption be decreased based on its cariogenic effects and due to significant concern and controversy with regard to the role of dietary sucrose in the etiology of heart disease and diabetes.

Low calorie sweeteners have been used as an alternative to sucrose, however, concern has been expressed with regard to their carcinogenic and other potentially hazardous side effects.

Refined sweeteners such as corn syrup, dextrose and fructose have also been used as an alternative to sucrose. However, they are considered "empty" carbohydrate calories because they lack naturally occurring nutritional components such as vitamins, minerals and proteins which are now believed to aid in the digestion of carbohydrates.

Sweetener compositions which are currently known and used as alternatives to sucrose may be divided into three categories. These categories include low calorie sweeteners, refined sweeteners and natural or nutritious sweeteners in the following discussion.

Low calorie sweeteners are sweetening compositions that have been prepared by diluting the sweetening power of synthetic sweeteners such as saccharine, cyclamate or dipeptides with dextrose, sucrose, polyglucose, corn syrup solids or maltodextrins.

These products have the advantage of fewer calories than an equivalent volume of sucrose. Some of these sweeteners, which include bulking agents such as corn syrup solids or maltodextrin in the formulation, also have the advantage of having complex carbohydrates. However, the low bulk density characteristic of these reduced calorie sweeteners also represent a very limited source (less than 0.5 g/teaspoon or 5 cc) of complex carbohydrates.

Very importantly, the low calorie sweeteners have the disadvantage of containing controversial synthetic sweeteners which also have off-tastes and which decompose under certain food processing conditions. They also have the disadvantage of a substantially lower bulk density than sucrose, thereby excluding their use as a direct substitute for sucrose in many dry food products. Lastly, these low calorie sweeteners are also obviously void of naturally occurring nutritional components such as vitamins, minerals and protein.

Refined sweeteners, as indicated above, include products such as corn syrup, dextrose and fructose as alternatives to sucrose. A blend of fructose and sucrose was thought to be advantageous in refined sweetener because less of the resulting sweetening composition product was required to sweeten foods, due to fructose being about 1.7 times sweeter than sucrose.

The primary disadvantage of such refined sweeteners is that they contain no other nutritional components such as vitamins, minerals and proteins, and for the most part are considered "empty" carbohydrate calories. The water whiteness of the refined sweeteners, as in the case of sucrose dissolved in water, is also considered a disadvantage since the consumer perceives this lack of color as evidence of the deficiency of natural nutritional components.

Nutritious or nutritional sweeteners contain nutritional components such as vitamins, minerals and proteins which occur naturally in addition to the normal carbohydrate content. These nutritious sweeteners include honey, maple, molasses, cane juice and hydrolyzed whole grain (sorghum, rice and barley) products. The distinct flavor associated with some nutritional sweeteners may make them undesirable as a substitute for sucrose in some food applications. Another disadvantage is the higher cost of natural sweeteners relative to sucrose making them economically unfeasible for many food applications where sucrose is currently used.

Nutritional sweeteners have been available in both liquid and solid forms. The solid sweetening compositions made from honey area combination of fructose, glucose and complex carbohydrates. The complex carbohydrates are added as a drying aid.

Dried molasses also required complex carbohydrates as a drying aid and resulted in a sweetening composition containing glucose, fructose and sucrose (greater than 25% on a dry weight basis) and complex carbohydrates. Maple syrup and cane juice have been dried directly by evaporation techniques and resulted in sweetening compositions primarily comprising sucrose (greater than 75% on a dry weight basis) and residual amounts of fructose and glucose. The hydrolyzed whole grain products have also been dried directly by dram or spray drying to result in a sweetening; composition including a combination of glucose, maltose and complex carbohydrates.

The nutritional sweeteners typically contain at least about 0.5% by weight combined protein, vitamins and minerals and are usually colored as opposed to the whiteness of refined sucrose. This relatively small percentage of nutritional components has been considered by some to be essential in the digestion and subsequent metabolization of carbohydrates.

Fruit juice concentrates are deficient in complex carbohydrates but do have a natural balance of fructose, glucose, sorbitol and sucrose and nutritional components such as vitamins, minerals and proteins. The primary difference between fruit juice and fruit juice concentrate is that the latter has been depectinized and concentrated to at least 40% and preferably to 60–72% soluble solids without gelation.

The flavor associated with these fruit juice concentrates of less than 72% soluble solids has also restricted their usage as a sweetener alternative for liquid sucrose or corn syrup. So called "deflavorized", "decolorized" and even "reduced acid" juice concentrates can be made from any clear fruit juice concentrate and have been made available commercially. "Fruit syrup concentrates" (as opposed to "fruit juice concentrates") are juice concentrates (thus depectinized) which are processed through a separate ion exchange system resulting in a substantially reduced flavor, color, acid and nutrients. However, some of these concentrates, and particularly pineapple, pear and mixed fruit, still exhibited significant color and fruit flavor identification, thus limiting their application.

The flavor associated with these fruit juice concentrates or fruit syrup concentrates, their poor storage stability, their physical and functional inability to be directly substituted for corn syrup or liquid sucrose in food formulations other than liquid beverages, and their high cost relative to sucrose or corn syrup have restricted their usage as an alternative sweetener. This is exemplified by the common use of fruit juice concentrates predominantly in the beverage industry at less than 10% by weight reconstituted juice, the primary sweetness being derived from alternative sources such as corn syrup products, artificial sweeteners, or sucrose.

U.S. Pat. No. 4,873,112 issued Oct. 10, 1989 to Mitchell, et al., under assignment to the owner of the present invention, disclosed an improved fruit concentrate sweetener composition and process of manufacture within the area of sweeteners last discussed above.

The patent disclosed a fruit concentrate sweetener composition and process of manufacture wherein the sweetener composition is formed as a blend of a hydrolyzed starch having a dextrose equivalent (D.E.) of up to about 25 and a fruit juice or fruit syrup concentrate of at least about 40% soluble solids and about 0% insoluble solids to form a liquor having a dry weight composition of about 40 to 65% complex carbohydrates, about 35 to 55% simple carbohydrates from the fruit juice or fruit syrup concentrate and about 0.5% nutritional components.

The fruit concentrate sweetener composition was preferably dried to about 78 to 80% soluble solids to make the sweetener composition suitable for replacing corn syrup and the like or to dry the product to about 96 to 99% soluble solids to make the sweetener composition suitable for replacing powdered or granulated sucrose and the like sweeteners. The dry fruit concentrate sweetener composition was also preferably compacted in order to provide a bulk density substantially identical to the bulk density of the replaced sweetener.

Because of the bulk density characteristics of the sweetener composition noted above, it could be substituted directly into most sweetened food and beverage products on a direct weight-for-weight basis compared to such conventional sweeteners.

Related U.S. Pat. No. 4,756,912 issued Jul. 12, 1988 to Mitchell, et al. and U.S. Pat. No. 4,876,096 issued Oct. 24, 1989, also to Mitchell, et al., disclosed a rice syrup sweetener product and method of production. The rice syrup sweetener of these patents was specifically disclosed for inclusion in the fruit concentrate sweetener and process of manufacture discussed above in connection with U.S. Pat. No. 4,873,112.

Accordingly, the above patents, as well as the additional prior art patents discussed below, are incorporated herein as though set forth in their entirety.

Numerous other prior art references have also disclosed sweeteners generally falling within the three categories initially discussed above.

As was also noted above, many different types of fat replacements or substitutes for food/beverage products, especially products such as baked goods, etc. have also been disclosed in the prior art. Representative examples of these prior art references are discussed below.

Initially, U.S. Pat. No. 4,973,489 issued Nov. 27, 1990 to Meyer, et al. under assignment to Curtice Burns, Inc., Rochester, N.Y., generally noted the desirability for replacing at least substantial portions of fat in the total calories for human consumption because of resulting problems of obesity and diseases such as heart disease. The patent further noted that possible low-calorie fats or fat substitutes in the then prior art included sugar polyesters, polyglycerol esters, sucrose polyesters (SPE), neopentyl-type alcohols and other sugar derivatives such as sorbitol and mannitol, glycerol dialkyl ethers, triglyceride esters of alpha carboxylic acids, diglyceride esters of short-chain dibasic acids, trialkoxytricarballylate, polydextrose, palatinose, polygalactose, N-oil (tapioca dextrin), microbiologically derived products, nonabsorbable synthetic polymers with properties similar to edible oil, tree derived products, low-metabolized natural fats and oils, biopolymers, branched polysaccharides and jojoba oil.

The Meyer, et al. patent further noted that one method of reducing the caloric value of edible fats and retaining the characteristic functional physical properties of fats in foods is to prepare fatty acid esters of sugar or fatty acid esters of sugar alcohols that have reduced absorption and digestion. Absorption and digestion can be reduced by altering either the alcohol or fatty acid portion of the compound. In conventional synthesis procedures, or example, interesterification can be used to prepare sucrose polyesters. However, interesterification frequently requires high temperatures and toxic solvents such as dimethylacetamide, dimethylformamide, or dimethylsulfoxide. Therefore, conventional interesterification is not suitable for food applications.

The Meyer, et al. patent then disclosed an improved process for the manufacture of saccharide fatty acid polyesters based on monosaccharides, disaccharides, sugar alcohols, trisaccharides, other polysaccharides and glycosides. These products were disclosed as being particularly effective as conventional fat substitutes with a novel method being disclosed for their formation. The fat substitute composition of the Meyer, et al. patent was more specifically referred to as a polysaccharide fatty acid polyester having at least four fatty ester groups, each fatty acid having from four to twenty-four carbon atoms and said polysaccharide being derived from a reducing polysaccharide converted into a non-reducing polysaccharide by formation of a $C_{1-6}$ alkyl glycoside or from a reducing polysaccharide converted into its corresponding alcohol.

Still other prior art patents have disclosed different but related compositions acting as fat substitutes or replacements. For example, U.S. Pat. No. 4,911,946 issued Mar. 27, 1990 to Singer, et al. under assignment to The NutraSweet Company, Deerfield, Ill., disclosed a fat substitute comprising waterdisbursible macro-colloid particles having a substantially spheroidal shape and a particle size distribution effective to impart substantially smooth organoleptic character of an oil-and-water emulsion, the particles being composed of carbohydrate materials.

U.S. Pat. No. 5,262,187 issued Nov. 16, 1993 to Hahn under assignment to The Pillsbury Company, Minneapolis, Min., disclosed a low-fat dry mix including a cereal-grain ingredient base with a fat mimetic system of polydextrose, cellulosic material, non-fat milk solid or substitute, emulsifier, modified food starch, and a mixture of xanthan gum and guar or locust bean gum, preferably with lecithin and whey protein concentrate.

U.S. Pat. No. 5,250,306 issued Oct. 5, 1993 to McCleary, et al. under assignment to British Sugar PLC, Peterborough, United Kingdom, disclosed a composition with polysaccharide araban extracted from sugar beet, preferably a debranched araban, as a fat substitute in desserts, etc.

U.S. Pat. No. 5,143,741 issued Sep. 1, 1992 to Podolski, et al. disclosed substantially non-aggregated casein micelles to replace all or a portion of the fat or cream in food products such as frozen dairy desserts, icings, puddings, whipped toppings, fortified skim milk, dips, spreads and sauces.

U.S. Pat. No. 5,104,674 issued Apr. 14, 1992 to Chen, et al. under assignment to Kraft General Foods, Inc., Glenview, Ill., disclosed the suitability of microfragmented ionic polysaccharide/protein complex dispersions for use as fat substitute compositions in food products such as ice cream, salad dressings, dips, spreads and sauces and methods for preparing such dispersions and food products.

U.S. Pat. No. 5,077,073 issued Dec. 31, 1991 to Ennis, et al. under assignment to The Procter & Gamble Company, Cincinnati, OH disclosed a fat substitute comprising an ethoxylated sugar or sugar alcohol sucrose fatty acid ester. It is further noted that the Ennis, et al. patent disclosed a very wide variety of specific food and beverage products suitable for substitution or replacement of fat components.

Generally, the fat substitute compositions disclosed by the preceding references relied upon the fat substitute compound having a chain length or other characteristics imitating the mouthfeel of fat or cream in foods and beverages. However, the substantial chain length or chemistry of such particles tends to prevent them from being absorbed within the body and having any sweetening characteristics. In this regard, it is noted for example that the Hahn patent discloses the addition of a sweetener in combination with its fat substitute component.

Still other components or compositions have been known to impart sweetness as well as other characteristics which may be similar to characteristics of fats of the type contemplated for replacement by products such as those described above. In this regard, it is noted for example that crystalline fructose has commonly been employed as a sweetener while also relying upon moisture retention or hygroscopicity or humectancy to maintain or increase the moisture level in products such as fruit based cookie bars and granola bars which might otherwise tend to dry out.

In this regard, it is further noted that U.S. Pat. No. 4,293,577 issued Oct. 6, 1981 to Ciliario under assignment to P. Ferrero & C. S.p.A., Alba, Italy disclosed the use of fructose for substantially replacing sucrose in food products, particularly preservable baked pastry products. However, that patent is also notable in specifically including conventional fat components such as vegetable fats and oils or monoglycerides to provide typical fat characteristics.

It is noted again that the preceding prior art references are merely illustrative or representative of a substantial number of references disclosing similar products for use either as sweeteners or as fat substitutes or replacements but not in the dual role of both sweetening and fat substitution.

SUMMARY OF THE INVENTION

Although the compounds and compositions of the prior art, as disclosed above, have been found to be suitable at least for their contemplated uses, there has been found to remain a need for further improved sweeteners, particularly compositions or compounds having a dual functionality in food/beverage products for achieving both sweetening and other characteristics such as desirable mouthfeel, moisture retention or humectancy, especially compositions or compounds having a dual functionality in food/beverage products for achieving both nutritive sweetening and fat substitution.

Multi-functionality of the sweetener composition of the present invention is demonstrated by its ability to simultaneously provide (a) substantial sweetening for the food/beverage product, (b) hygroscopicity or humectancy for the food/beverage product, (c) desirable mouthfeel for the food/beverage product, (d) faster mixing, particularly in baked goods, (e) faster baking (because of less available free water in the baking mix due primarily to concentration of the sweetener composition prior to its incorporation into the baking mix), (f) reduced baking temperatures (because sweeteners such as fructose brown at lower temperatures), (g) improved shelf life, particularly for baked goods because of the water activity of the composition of the invention, and (h) shelf stability at room temperatures, (i) metabolic benefits of metabolization over long periods, particularly compared to simple carbohydrates, (j) salt reduction, (k) a reduction or even elimination in preservatives or anti-oxidants required in the composition or in food/beverage products including the composition because of its stability, and (l) non-crystallization, particularly in confections, baked goods and other products subject to surface :sugar graining, the multi-function sweetener composition comprising a dextrin component or components including one or more dextrins or complex carbohydrates and forming at least about 3–20% of the multi-function sweetener composition on a dry weight basis, and a simple carbohydrate component or components comprising one or more simple carbohydrates and including at least one simple carbohydrate having hygroscopic or humectant properties, the simple carbohydrate component(s) forming at least about 70% of the multi-function sweetener composition on a dry weight basis, the multi-function sweetener composition being further characterized by sweetness at least about equal to sucrose while having about 0% insoluble solids and being concentrated to at least about 77% soluble solids (BRIX), preferably a liquid of about 77–80 BRIX.

Accordingly, it is an object of the present invention to provide an improved composition or compound exhibiting multi-functionality in food/beverage formulations for achieving both sweetening and other characteristics as summarized above.

More specifically, it is an object of the invention to provide such a composition or compound which is preferably a fruit concentrate composition exhibiting dual functionality in food/beverage products for achieving nutritive sweetening as well as other characteristics, preferably fat substitution or replacement.

More preferably, it is an object of the invention to provide a fruit concentrate composition formed as a blend of a hydrolyzed starch having a dextrose equivalent (D.E.) of at least about 40, preferably about 50–70 and more preferably about 55–65, and a fruit concentrate having about 0% insoluble solids, the blended fruit concentrate composition having a dry weight composition of at least about 70% simple carbohydrates and about 3–20% complex carbohydrates with a sweetness at least about equal to sucrose and a resulting dual functionality in food formulations for achieving both nutritive sweetening and fat substitution. Even more preferably, the hydrolyzed starch provides no more than about 55% and more preferably, no more than about 50% of the simple carbohydrates in the blended fruit concentrate composition. The fruit concentrate may be any commercially available fruit concentrate comprised of fructose, glucose, sucrose or sorbitol or any combination thereof. The term "fruit concentrate" is used in connection with the present invention to include both fruit concentrates and fruit juice concentrates having about 0% insoluble solids. Here again, the term "about 0% insoluble solids" is intended to include up to about 2%, usually no more than about 0.5% insoluble solids frown the fruit concentrate or fruit juice concentrate. However, it is possible that other insoluble solids may be present in the fruit concentrate or in the blended fruit concentrate composition if desired or necessary.

It is yet another object of the invention to reduce the water content of the blended fruit concentrate composition to at least about 77% soluble solids and more preferably concentrate the composition to a liquid range of about 77–80% whereby the blended fruit concentrate composition is stable and has a resulting dual functionality as described above. Reduction of the water content is important to develop the reduced water activity described below and also to develop a resulting free water level in both the sweetener composition and in formulations or recipes including the sweetener composition for the benefit of its multi-functionality, especially the dual functionality of sweetening and fat substitution. Both water activity and free water content may also depend on other characteristics such as carbohydrate character or profile. However, given the carbohydrate character or profile defined for the composition of the invention, it is believed essential to reduce water content as described above in order to achieve a maximum water activity for the composition of about 0.68, preferably about 0.64 and to maintain the desirable resulting free water level in both the composition and its formulations or recipes including the sweetener composition for the benefit of its multi-functionality, especially the dual functionality of sweetening and fat substitution.

More preferably, the composition has about 80–95% simple carbohydrates and about 3–10% complex carbohydrates, most preferably about 90–95% simple carbohydrates and about 6% complex carbohydrates.

The simple carbohydrates are preferably selected from the class consisting of glucose, maltose, fructose, sucrose, lactose, sorbitol and combinations thereof, the complex carbohydrates preferably comprising one or more dextrins. The simple carbohydrates are more preferably selected to include at least one component having humectant properties in order to enhance the dual functionality of the composition as a sweetener and fat substitute. The simple carbohydrates may also be provided in the composition from a third source separate from the hydrolyzed starch and fruit concentrate.

It is a still further object of the invention to provide a food/beverage product including a fruit concentrate composition which is a blend of a hydrolyzed starch having a dextrose equivalent (D.E.) of at least about 40, preferably about 50–70 and more preferably about 55–65, and a fruit concentrate having about 0% insoluble solids, the blended fruit concentrate composition having a dry weight composition of at least about 70% simple carbohydrates and about 3–20% complex carbohydrates with a sweetness at least about equal to sucrose and a resulting dual functionality food/beverage formulations for achieving both nutritive sweetening and fat substitution.

It is a further related object of the invention to provide a method for developing sweetness and fat substitution in food/beverage products, the method including the step of replacing at least a portion of normal sweeteners and fat components with a fruit concentrate composition as summarized above.

Both the food/beverage products and method of providing sweetness and fat substitution therein preferably contemplate a composition having characteristics as summarized above.

It is yet another object of the invention to provide a food/beverage product including a multi-function sweetener composition simultaneously providing (a) substantial sweetening for the food/beverage product, (b) hygroscopicity or humectancy for the food/beverage product, (c) desirable mouthfeel for the food/beverage product, (d) faster mixing, particularly in baked goods, (e) faster baking (because of less available free water in the baking mix due primarily to concentration of the sweetener composition prior to its incorporation into the baking mix), (t) reduced baking temperatures (because sweeteners such as fructose brown very rapidly), (g) improved shelf life, particularly for baked goods because of the water activity of the composition of the invention, and (h) shelf stability at room temperatures, (i) metabolic benefits of metabolization over long periods, particularly compared to simple carbohydrates, (j) salt reduction, (k) a reduction or even elimination in preservatives or anti-oxidants required in the composition or in food/beverage products including the composition because of its stability, and (l) non-crystallization, particularly in confections, baked goods and other products subject to surface sugar graining, the multi-function sweetener composition comprising a dextrin component or components including one or more dextrins or complex carbohydrates and forming at least about 3–20% of the multi-function sweetener composition on a dry weight basis, and a simple carbohydrate component or components comprising one or more simple carbohydrates and including at least one simple carbohydrate having hygroscopic or humectant properties, the simple carbohydrate component(s) forming at least about 70% of the multi-function sweetener composition on a dry weight basis, the multi-function sweetener composition being further characterized by sweetness at least about equal to sucrose while having about 0% insoluble solids and being concentrated to at least about 77% soluble solids (BRIX), preferably a liquid of about 77–80 BRIX.

For purposes of the present invention, certain terms are defined herein. Specifically, simple carbohydrates are intended by the present invention to include both DP 1 and DP 2 while complex carbohydrates are considered to be DP 3 and greater. The sweetness of the sweetener composition of the present invention is characterized in a number of ways including having a sweetness at least about equal to sucrose. In that regard, the sweetener composition of the present invention is assumed to exhibit a sweetness of at least 90% of the sweetness of sucrose, preferably at least about 95% of the sweetness of sucrose or greater.

Stability of the sweetener composition of the present invention is based primarily upon its water activity on a microbiological basis. Functionality of the sweetener composition is partially but importantly based upon water activity because of reduced and controlled free water in the composition and in a formulation or recipe including the composition for purposes of its multi-functionality or dual functionality as described herein. In this regard, water activity is defined as the percent equilibrium relative humidity divided by 100. In practice, it is the measure of free water in a system, that is, water that is not bound within the makeup of that system and which is available for microbial spoilage as well as enzymatic activity, product degradation through reactions causing changes in taste, smell and color and action of certain vitamins.

Most food spoilage bacteria will not grow below 0.9 water activity ($A_w$) and most food spoilage molds cannot grow below 0.8. Food poisoning bacteria, *Staphylococcus aurrus* has been found to grow at 0.86 while *Clostridium botulinum* will not grow below 0.94.

Just as yeasts and molds grow over a wider pH range than bacteria, the same is true for water activity. The lowest reported value for any type of bacteria is 0.75 for halophilic (salt-loving) bacteria, while xerophilic (dry-loving) molds and osmophilic (high osmotic pressure-loving) yeasts have been reported to grow at water activity values of 0.65 and 0.60 respectively. These values are reference points since they are affected by changes in temperature and nutrient content. Generally, at any temperature, the ability for growth is reduced as water activity is lowered. Also, the range of water activity over which growth occurs is greatest at optimum temperatures and the presence of nutrients increases the range of water activity over which organisms can survive. It is understood that compounds having a water activity of 0.85 or less are considered commercially shelf stable by the canning industry.

Considering the above discussion in terms of the present invention, a fruit juice concentrate (at 70 BRIX) generally has a water activity of about 0.90 clearing indicating its lack of shelf stability. By contrast, both high fructose corn syrup and liquid FRUITSOURCE Original, disclosed in U.S. Pat. No. 4,873,112 referred to above, have a water activity of about 0.7. FRUITSOURCE Granular, also disclosed in the above patent, has a very low water activity of 0.23 because of its dry nature. By contrast, the sweetener composition of the present invention, available under the trademark FRUITSOURCE Plus has a water activity of 0.64 indicating its superior shelf stability.

It is a still further object related to the objects set forth above to form the composition by a method wherein the hydrolyzed starch is non-allergenic and wherein hydrolysis of the starch is carded out enzymatically by a non-allergenic enzyme or enzymes in order that all components of the blended fruit concentrate composition are non-allergenic. For purposes of the present invention, the term "nonallergenic" is intended to mean common or normal allergies such as corn allergies, wheat allergies, barley allergies, etc. Thus the sweetener composition may be formed from a variety of starch sources and fruit concentrates. However, more preferably, the non-allergenic composition comprises a starch formed from rice and wherein the fruit concentrate is selected from the class consisting of grapes, pears, pineapple, apples, melons, berries, plums, prunes, or any commercially available fruit concentrate consisting of any combination of glucose, fructose, sucrose and sorbitol, and mixtures of any of the above.

Additional objects and advantages of the invention are made apparent in the following description and examples of the invention.

DESCRIPTION OF THE PREFERRED EMBODIMENTS

The present invention, in at least one embodiment, provides a fruit concentrate composition preferably formed as a blend of a hydrolyzed starch and a fruit or fruit juice concentrate having about 0% insoluble solids. The hydrolyzed starch is preferably formed from a grain and has a dextrose equivalent (D.E.) of at least about 40, preferably about 50–70 and more preferably about 55–65. The blended fruit concentrate composition has a dry weight composition of at least about 70%, preferably about 80–95% and more preferably about 90–95% simple carbohydrates and about 3–20%, preferably about 3–10% and more preferably about 6% complex carbohydrates. The blended fruit concentrate composition of the invention has been surprisingly found to have a resulting dual functionality in foods/beverage formulations for achieving both nutritive sweetening and fat substitution. The blended fruit concentrate composition is preferably formed from about a 50–50 blend, on a dry weight basis, of the hydrolyzed starch and fruit concentrate, the resulting blended and concentrated composition comprising at least about 77% soluble solids. The resulting blended fruit concentrate composition is more preferably in a liquid form including about 77–80% soluble solids in order to enhance the other characteristics of the composition as described above and also to provide microbiological stability within the composition. The microbiological stability of the composition, intended for improving shelf life of the composition by inhibiting mold formation, is particularly characterized by the level of water activity in the composition, as defined above.

In the blended fruit concentrate composition, the complex carbohydrates are preferably dextrins as defined in greater detail below, the simple carbohydrates preferably being selected from the class consisting of glucose, maltose, fructose, sorbitol, sucrose, lactose and combinations thereof. At least some of the simple carbohydrates may be provided by a third source separate from the hydrolyzed starch component or fruit concentrate component. More preferably, at least one of the simple carbohydrates is selected to have humectant properties and to impart those properties to the blended fruit concentrate composition in order to enhance its dual functionality as a sweetener and fat substitute. The fruit concentrate is preferably selected from the class consisting of grapes, pears, pineapple, apples, melons, berries, plums, prunes, or any commercially available fruit concentrate consisting of any combination of glucose, fructose, sucrose or sorbitol, and mixtures of any of the above. More broadly, the fruit concentrate may be any commercially available fruit or fruit juice concentrate comprised of any combination of fructose, glucose, sucrose and sorbitol and mixtures thereof. Grape juice concentrate has been found to be a particularly effective source of fruit juice concentrate for the present invention. However, other fruits may be equally or even more desirable in certain applications. For example, pear juice concentrate is a particularly good source for sorbitol which has also been formed to provide desirable humectant properties in connection with the present invention.

The fruit concentrate composition summarized above is preferably formed in a process including the steps of:

(a) initially forming a syrup from a grain or starch source, preferably rice but also possibly corn, barley, wheat, potatoes, tapioca, etc., and having a dextrose equivalent (D.E.) of at least about 40, preferably about 50–70 and more preferably about 55–65, this step being performed in accordance with the common disclosure of U.S. Pat. Nos. 4,756,912 and 4,876,096 discussed above and incorporated herein by reference;

(b) blending the grain syrup of step (a) with a fruit concentrate having about 0% insoluble solids, the fruit concentrate being formed generally in accordance with the disclosure of U.S. Pat. No. 4,873,112, also discussed above and incorporated herein by reference, that patent being assigned to the assignee: of the present invention; and (c) reducing the water content of the blended fruit concentrate composition formed in step (b) to at least about 77% soluble solids ( 77 BRIX), more preferably to a liquid of about 77–80 BRIX, step (c) also being carded out in a manner disclosed in U.S. Pat. No. 4,873,112, the process steps (a), (b) and (c) being particularly selected in accordance with the present invention to provide a blended fruit concentrate composition which is stable and includes a composition as summarized above in order to produce a resulting dual functionality in food/beverage formulations for achieving both nutritive sweetening and fat substitution as well as other desirable functionalities such as those summarized above.

As indicated, the preferred concentrations and components described above for the fruit concentrate composition also preferably apply to the process described immediately above. In that regard, the fruit concentrate composition preferably has about 0% insoluble solids and a dry weight composition of at least about 70% simple carbohydrates and about 3–20% complex carbohydrates with a sweetness at least about equal to sucrose and a resulting dual functionality in food/beverage formulations for achieving both nutritive sweetening and fat substitution. Even more preferably, the hydrolyzed starch provides no more than about 55% and more preferably, no more than about 50% of the simple carbohydrates in the blended fruit concentrate composition. Even more preferably, the blended fruit concentrate composition has a dry weight composition of at least about 80–95% simple carbohydrates and about 3–10% complex carbohydrate, most preferably about 90–95% simple carbohydrates and about 6% complex carbohydrates. The simple carbohydrates are preferably selected from the class consisting of glucose, maltose, fructose, sucrose sorbitol, lactose and combinations thereof, the complex carbohydrates preferably comprising one or more dextrins. The simple carbohydrates are even more preferably selected to include at least one component such as fructose and/or sorbitol having humectant properties in order to enhance the dual functionality of the composition as a sweetener and fat substitute as well as the other desirable functionalities of the composition described herein.

It is further contemplated that both the product and method as summarized above may be adapted to provide a commonly or normally non-allergenic composition. The non-allergenic nature of the bait concentrate composition is particularly facilitated because of the non-allergenic nature of the fruit or fruit juice concentrate making up a substantial portion of the composition. However, to make the composition non-allergenic with respect to normal or common allergies such as wheat allergies, barley allergies and others, the hydrolyzed starch is preferably formed from a grain or other source which is suitably non-allergenic. In this regard, rice has been found to be a particularly suitable source for the hydrolyzed starch as described in greater detail below. In addition, where hydrolysis of the starch is carried out enzymatically, it is preferred that a non-allergenic enzyme or enzymes be employed in the method summarized above in order to ensure that all components of the blended fruit concentrate composition are non-allergenic. For such a composition, the enzymes are preferably selected from a bacterial source and not from a source based on grains such as wheat, barley, etc.

The blended fruit concentrate composition of the present invention has been found to be surprisingly effective, as noted above, for providing a dual functionality of both sweetening and fat substitution or replacement. In this regard, the composition of the present invention is particularly contemplated as a component in a wide variety of food/beverage products requiring multi-functionality of sweetening and additional characteristics such as mouthfeel and humectancy but especially the dual functionality of sweetening and fat substitution or replacement.

A variety of food/beverage products in which the composition of the present invention is particularly suitable is described for example in many of the prior art references described above and incorporated herein by reference. It is noted again that such products particularly include baked goods, confections, granola bars, fruit bars, sweetened breakfast cereals, sauces, salad dressings, sports nutrition foods and beverages, curing agents for meat and dough conditioners. These applications are only examples of a wide variety of applications for the composition of the invention. Specific examples of such products are set forth further below.

In the food/beverage products as outlined above, the fruit concentrate composition of the present invention is included as a substantial component either in an original formulation or as a substitute for both original sweeteners and fats or fat-like components in original formulations for the products.

Preferably, the fruit concentrate composition provides substantial sweetening for the product while replacing at least about 25% of normal fat components therein, in some occasions at least about 50% of normal fat components in the product and in at least some applications, substantially all of the original normal fat components in the formulation.

The method for forming such foods/beverage products with the :fruit concentrate composition of the present invention simply comprises the steps of either originally formulating the product or possibly replacing original sweeteners and fat components or fat-like components, at least partially, with the fruit concentrate composition of the present invention.

Here again, non-allergenic properties of a preferred version of the invention may be employed in any of the food/beverage products, particularly where the remaining components in the products are also selected to be normally or commonly non-allergenic.

The invention also contemplates a multi-function composition consisting of simple carbohydrates and complex carbohydrates or dextrins as summarized above to provide sweetening in the food/beverage products in addition to other characteristics such as mouthfeel and humectancy or moisture retention. However, more particularly, the composition is employed because of its surprising dual functionality as both a sweetener and fat substitute or replacement.

The composition of the invention is particularly cost effective in many of the food/beverage products referred to above and described in greater detail below. At least for certain applications, specific sources for the simple carbohydrates and complex carbohydrates or dextrins may provide further enhanced combinations of functionalities in the food/beverage products. For example, the simple carbohydrates or at least a portion thereof may be particularly selected to have humectant or moisture retention characteristics in order to particularly enhance the dual functionality of the composition as both a sweetener and fat substitute or replacement.

Furthermore, a variety of grains and fruits may be selected as the source for the complex carbohydrates and the simple carbohydrates. As indicated above, the simple carbohydrates may also be provided at least in part by a third source added to the sweetener composition. In addition, those components may even be obtained for example by synthesis, at least for certain applications of the composition. In addition, the complex carbohydrates or dextrins are preferably selected to have a substanttial portion thereof in the form of short chains, that is, from about DP 3 to DP 20 in order to further enhance the dual functionality of the composition and to particularly enhance its functionality in other regards. In particular, the selection of the complex carbohydrates or dextrins to include a substantial portion of short chains as discussed above is believed to substantially improve the mouthfeel of the composition, particularly when used in food/beverage products. More preferably, the complex carbohydrates or dextrins are selected to have at least a substantial portion in the range of about DP 3 to DP 10 and most preferably about DP 3 to about DP 7 in order to even further enhance the dual functionality of the sweetener composition as noted above. Rice hydrolysates suitable for this application were found to contain complex carbohydrates in the range of DP 3 to DP 20. Referring to Table 1, complex carbohydrates between DP 3 through 6, as determined by High Pressure Ion Chromatography with a Pulsed Amperometric Detector, are given individually. Complex carbohydrates of greater than DP 7 are then reported as a sum. However, using the HPIC, polymers up to DP 20 could be discerned. It is believed, that at least about 50% of the polymers greater than DP 7 are within the range of DP 7 to DP 20.

The composition of the invention is further contemplated at least in a preferred embodiment, as a liquid component having at sweetness generally equal to that of sucrose. The liquid version of the composition, particularly with relatively high solids and a composition as summarized above, has been found to be particularly effective for enhancing its dual functionality of sweetening and fat substitution or replacement. It is contemplated that the composition could possibly be evaporated or otherwise dried to form a substantially dry or amorphous glass product which might be particularly desirable in certain applications. However, it is particularly contemplated according to the present invention that the water content of the composition be reduced as described above to at least about 77 BRIX and more preferably to a liquid form of about 77–80 BRIX. Accordingly, the composition of the present invention could be available in a wide variety of forms depending upon the desired application and also depending upon available sources for the simple carbohydrates and complex carbohydrates or dextrins in the composition. However, the liquid form of the composition with preferably at least about 77 BRIX and more preferably about 77–80 BRIX is preferred as set forth above.

A more detailed description is set forth immediately below concerning both the composition of the invention and particularly the method for forming the composition. In that regard, the method for forming the composition is particularly directed toward formation of the composition as a blend of a hydrolyzed starch, preferably from a grain origin, and a fruit or fruit juice concentrate providing the simple carbohydrates for the resulting sweetener composition.

As noted above, the hydrolyzed starch component of the fruit concentrate composition is foraged in accordance with the common disclosure of U.S. Pat. Nos. 4,756,912 and 4,876,096 in order to produce the desired characteristics for the hydrolyzed starch component as defined herein.

It is particularly to be noted in the above patents that different enzymes may be employed (for liquefaction and/or saccharification) in order to achieve various desired characteristics such as the preferred D.E. value set forth herein.

To more particularly describe these various enzyme systems, the: dextrinization or liquefaction step is preferably carried out with enzymes having alphaamylase activity common for microorganisms such as *Bacillus subtilis*, *Bacillus licheniformis* and *Bacillus stearothermophilus*. These enzymes can be used in a pH range of from about 3.5 to 7.5 and at a temperature ranging from 30° C. to 130° C.

The saccharification step is carried out with an endoglucosidase or an exoglucosidase, together or alone, or in combination with a beta-amylase or other maltose producing enzyme. Such glucosidase enzymes are typically produced by microorganisms selected from *Bacillus subtills, Aspergillus niger, oryzae*, and *Rhizopus oryzae*. Beta-amylase enzymes are typically extracted from the following grains: barley, wheat, rye, sweet potato or soy beans. The most common source of commercial beta-amylase is from barley. Microbial sources of maltose producing enzymes are available from *Bacillus subtills, Aspergillus niger*, and oryzae, as well as *Rhizopus oryzae*. The latter enzymes are more preferred when a hypo-allergenic fruit sweetener composition is desired and more specifically, when a maltose producing enzyme not derived from wheat, barley, rye or soy beans is desired.

According to the present invention, the hydrolyzed starch component described above preferably has a dextrose equivalent of at least about 40, preferably about 50–70 and more preferably about 55–65 while being formed from various dextrins. Blending of the hydrolyzed starch component with a fruit or fruit juice concentrate, also according to the present invention, has been found not only to provide the unique dual functionality of sweetening and other characteristics, preferably fat replacement or fat substitution, but also to facilitate both deflavorization and storage characteristics of the resulting blended composition, at least where: the composition is further processed as described herein.

Suitable fruit or fruit juice concentrates are prepared from fruit components or fruit juices having substantially 0% insoluble solids by depectinizing and then concentrating the fruit components or juices to a concentration greater than about 40% and preferably between about 60–72% soluble solids. Prior to concentration, the clear fruit juices may be subject to decolorization and deflavorization by activated carbon and possibly acid reduction by deionizing techniques. Depending on the application of the fruit concentrate sweetener composition, the flavor resulting from the fruit concentrates may or may not be acceptable. However, a substantially completely deflavorized version of the product is preferred, particularly where the effective absence of fruit flavor identification is critical.

It is particularly contemplated by the present invention that the deflavorized fruit juice concentrate or fruit syrup concentrate be formed from any of a wide variety of fruits including grapes, pears, pineapple, apples, melons, berries, plums, prunes, or any commercially available fruit concentrate consisting of any combination of glucose, fructose, sucrose and sorbitol, and mixtures of any of the above. More broadly, the fruit concentrate may be any commercially available; fruit or that juice concentrate comprised of any combination of fructose, glucose, sucrose and sorbitol and mixtures thereof. However, certain of these fruits may be particularly preferred in certain applications. For example, fruit juice concentrate formed from grapes has been found to be a particularly desirable component in the blended fruit concentrate composition of the invention. Similarly, a fruit juice concentrate formed for example from pears may be particularly preferred in order to provide a substantial portion of the simple carbohydrates in the form of sorbitol which is also noted herein to be humectant.

With greater than 77% soluble solids, the product requires no refrigeration and for the most part is microbiologically stable due to the reduced water activity and osmotic pressure of the product. It was further found that this 77% fruit concentrate sweetener composition and particularly the deflavorized version, could readily be used to replace corn syrup on a 1:1 basis in many food applications including confectionery systems.

Stability of the sweetener composition of the present invention is based primarily upon its water activity on a microbiological basis. In this regard, water activity is defined as the percent equilibrium relative humidity divided by 100. In practice, it is the measure of free water in a system, that is, water that is not bound within the makeup of that system and which is available for microbial spoilage as well as enzymatic activity, product degradation through reactions causing changes in taste, smell and color and action of certain vitamins.

Most food spoilage bacteria will not grow below 0.9 water activity ($A_w$) and most food spoilage molds cannot grow below 0.8. Food poisoning bacteria, Staphylococcus aurrus has been found to grow at 0.86 while *Clostridium botulinum* will not grow below 0.94.

Just as yeasts and molds grow over a wider pH range than bacteria, the same is true for water activity. The lowest reported value for any type of bacteria is 0.75 for halophilic (salt-loving) bacteria, while xerophilic (dry-loving) molds and osmophilic (high osmotic pressure-loving) yeasts have been reported to grow at water activity values of 0.65 and 0.60 respectively. These values are reference points since they are affected by changes in temperature and nutrient content. Generally, at any temperature, the ability for growth is reduced as water activity is lowered. Also, the range of water activity over which growth occurs is greatest at optimum temperatures and the presence of nutrients increases the range of water activity over which organisms can survive. It is understood that compounds having a water activity of 0.85 or less are considered commercially shelf stable by the canning industry.

Considering the above discussion in terms of the present invention, a fruit juice concentrate (at 70 BRIX) generally has a water activity of about 0.90 clearing indicating its lack of shelf stability. By contrast, both high fructose corn syrup and liquid FRUITSOURCE Original, disclosed in U.S. Pat. No. 4,873,112 referred to above, have a water activity of about 0.7. FRUITSOURCE Granular, also disclosed in the above patent, has a very low water activity of 0.23 because of its dry nature. By contrast, the sweetener composition of the present invention, available under the trademark FRUITSOURCE Plus has a water activity of 0.64 indicating its superior shelf stability.

It is also contemplated that the fruit concentrate composition described above can possibly be synthesized from component parts in order to produce a multi-function sweetener composition simultaneously providing (a) substantial sweetening for the food/beverage product, (b) hygroscopicity or humectancy for the food/beverage product, (c) desirable mouthfeel for the food/beverage product, (d) faster mixing, particularly in baked goods, (e) faster baking (because of less available free water in the baking mix due primarily to concentration of the sweetener composition prior to its incorporation into the baking mix), (f) reduced baking temperatures (because sweeteners such as fructose brown very rapidly), (g) improved shelf life, particularly for baked goods because of the water activity of the composition of the invention, and (h) shelf stability at room temperatures, (i) metabolic benefits of metabolization over long periods, particularly compared to simple carbohydrates, (j) salt reduction, (k) a reduction or even elimination in preservatives or anti-oxidants required in the composition or in food/beverage products including the composition because of its stability, and (l) non-crystallization, particularly in confections, baked goods and other products subject to surface sugar graining, the multi-function sweetener composition comprising a dextrin component or components including one or more dextrins or complex carbohydrates and romping at least about 3–20% of the multi-function sweetener composition on a dry weight basis, and a simple carbohydrate component or components comprising one or more simple carbohydrates and including at least one simple carbohydrate having hygroscopic or humectant properties, the simple carbohydrate component(s) forming at least about 70% of the multi-function sweetener composition on a dry weight basis, the multi-function sweetener composition being further characterized by sweetness at least about equal to sucrose while having about 0% insoluble solids and being concentrated to at least about 77% soluble solids (BRIX), preferably a liquid of about 77–80 BRIX.

For purposes of the present invention, certain terms are defined herein. Specifically, simple carbohydrates are intended by the present invention to include both DP 1 and DP 2 while complex carbohydrates are considered to be DP 3 and greater. The sweetness of the sweetener composition of the present invention is characterized in a number of ways including having a sweetness at least about equal to sucrose. In that regard, the sweetener composition of the present invention is assumed to exhibit a sweetness of about 90–95% the sweetness of sucrose or greater.

As noted above, the sweetener composition of the present invention is described herein as being formed from a blend of a hydrolyzed starch or grain and a fruit or fruit juice concentrate. However, it is again to be noted that the composition as summarized above and described herein could also possibly be formed by synthesis of the component parts of the composition. In this regard, it is contemplated that a simple carbohydrate such as fructose included as a component in the composition could be produced, for example, from corn by techniques well known to those skilled in the art. Similarly, other components of the composition including the various simple carbohydrates and complex carbohydrates could also be produced from different or possibly combined natural sources for certain of the components. In this regard, it is again noted that the various components of the composition are essential to achieve the multi-functional benefits summarized above, particularly the dual functionality of sweetening and fat substitution. In that regard, it is particularly to be noted that the use of refined sugars are not effective to replace corresponding components of the composition. Rather, it is essential to synthesize substantially the same components of the composition.

With the fruit concentrate or multi-function sweetener composition of the invention being formed as described above, the composition can then be used in a variety of food/beverage products of the type generally also summarized above and described in greater detail below.

Because of the unique characteristics and particularly because of the dual functionality of the composition of the present invention, it may be necessary to adjust original formulations and methods for preparing certain food products in which the composition is to be used. Such adjustments are particularly desirable in order to obtain the unexpected benefits of replacing other sweeteners and at the same time reducing fat or fat-like components as well as other components such as salt.

Preferably, the composition of the invention is considered as a replacement for both liquid and dry sugar on a one-for-one basis. This basis is set forth because of the equivalent sweetness of the composition to sucrose which is commonly employed as a sweetener in many formulations or recipes.

At least partially due to the humectant or moisture retention characteristics of the fruit concentrate composition of the invention, it is also possible to reduce substantial fat or fat-like components in such formulations. In this regard, it is considered readily possible to replace as much as 25% of original fat components in many formulations or recipes. In many applications as much as 50% of the original fat components may be replaced and at least in certain applications, substantially all of the original fat components may be replaced with accompanying advantages on a dietetic basis.

Generally, in substituting the fruit concentrate composition of the present invention for sweeteners and/or fat components in such formulations or recipes, it is possible to experiment by replacing an initial portion of the fat, possibly 25% and then gradually increasing the amount of fat replacement until desired characteristics are achieved in the product.

If the finished product is too oily, it is of course possible to remove additional fat components and adjust other ingredients in the formulation or recipe accordingly. If the finished product is too moist, the amount of liquid in the formulation or recipe may be reduced or additional solids added in the form of flour or even a granular sweetener as disclosed for example in U.S. Pat. No. 4,873,112 noted above. As noted above, the amount of fat replacement may be increased either until substantially all fat in the original formulation or recipe is replaced or until a desired balance of taste, texture and fat reduction is found to be particularly desirable.

It has been found that, when replacing dry sugar or sweeteners with a liquid form of the fruit concentrate composition, it may be desirable to balance solids in the formulation or recipe by adding additional solids such as flour or a sweetener as noted above. The choice between flour or a granular sweetener may depend at least partially upon whether additional sweetness is desired in the formulation.

Particularly in baked goods, formulations or recipes may be best prepared at a baking temperature of about 325°–350° F. This may often result in a reduction of oven temperatures (possibly 25°–50° F.) compared to the original formulation. Generally, lower baking temperatures have been found to be particularly desirable with the fruit concentrate composition of the present invention since it facilitates more even baking of many food products while providing other multi-functional benefits as described above.

As was also noted above, the fruit concentrate composition of the invention may be formed entirely from commonly or normally non-allergenic components. Accordingly, it may also be used in food/beverage formulations to achieve similar non-allergenic characteristics. However, in such an event, it is of course obvious that the other components in the formulation or recipe must also be selected on a generally non-allergenic basis.

Otherwise, more specific examples of food/beverage products formed with the fruit concentrate composition of the invention are set forth in the following examples.

Accordingly, the present invention has been described above in connection with a novel fruit concentrate composition of multi-functional sweetener composition and method of its formation as well as use of the resulting composition in various food/beverage products. Further preferred details for both the composition and process of manufacture, as well as the resulting food/beverage products, are made apparent in the following examples.

EXPERIMENTAL SECTION

The initial Examples 1–5 represent a variety of grain syrups, preferably formed from rice and in accordance with the common disclosure of U.S. Pat. Nos. 4,756,912 and 4,876,096 and more specifically having characteristics as set forth in following Table 1. Generally, these examples illustrate a variety of D.E. values from about 40 at least up to a value of about 60. Other characteristics of the grain syrup of Examples 1–5 are further defined in terms of the enzyme or enzymes employed to form the syrup, the composition of the syrup in terms of complex carbohydrates and simple carbohydrates, for example, and the percentage of soluble solids.

Rice hydrolysates prepared from whole ground rice (white, brown or partially polished) and according to U.S. Pat. Nos. 4,756,912 and 4,876,096, and found suitable for use in the fruit sweetener composition of this invention are given in Table 1 below for a range of DE 40 to DE 70. This table reflects the relative carbohydrate distribution of the suitable rice hydrolysates. The analysis of cloudy rice hydrolysates from white and brown rice, as well as rice hydrolysates which have gone through an additional step of clarification are given in Table 2 below.

TABLE 1

Carbohydrate Profile and Dextrose Equivalent for Rice Hydrolysates

| Carbohydrate Profile ↓ | Ex. 1 | Ex. 2 | Ex. 3 | Ex. 4 | Ex. 5 |
|---|---|---|---|---|---|
| DP 1 (glucose) (wt %) | 5 | 18 | 33 | 32 | 56 |
| DP 2 (maltose) (wt %) | 44 | 43 | 37 | 33 | 26 |
| DP 3 (maltotriose) (wt %) | 15 | 8 | 3 | 3 | 3 |
| DP 4 (maltotetraose) (wt %) | 2 | 2 | 2 | 1 | 3 |
| DP 5 (maltopentaose) (wt %) | 2 | 2 | 2 | 3 | 3 |
| DP 6 (maltohexaose) (wt %) | 2 | 2 | 2 | 2 | 2 |
| DP 7 (maltoheptaose) (wt %) | 3 | 2 | 1 | 2 | 1 |
| DP > 7 (wt %) | 27 | 23 | 20 | 24 | 6 |
| Dextrose Equiv. (DE) | 42 | 50 | 55 | 60 | 70 |

Examples 1–5 illustrate substantial variety for hydrolyzed starches formed from rice in accordance with U.S. Pat. Nos. 4,756,912 and 4,876,096 referred to above and incorporated herein. As described in detail within those patents, hydrolyzed starches such as Examples 1–5 are preferably formed from whole grain rice with other characteristics as defined in the above patents and illustrated in Examples 6–9 of Table 2 below.

It was found that rice hydrolysates that have gone through the additional step of clarification, when blended and concentrated with the fruit juice concentrate, produced a composition having a flavor that was cleaner, or lacking any hint of a slight grain taste as compared with a fruit sweetener composition prepared using a cloudy rice hydrolysate as described in the above patents. Rice hydrolysates prepared from white rice had a lower fat content overall than rice hydrolysates from brown rice. All of the above mentioned rice hydrolysates blended and concentrated with a fruit juice concentrate produced a fruit sweetener composition having functionality as described in this invention.

As noted above, Table 2 represents physical characteristics for different rice hydrolysates also formed in accordance with U.S. Pat. Nos. 4,756,912 and 4,876,096. More specifically, Examples 6–9 of Table 2 illustrate physical characteristics of rice hydrolysates, generally similar to those illustrated by Examples 1–5 in Table 1, but formed respectively either from whole grain white rice or brown rice. In addition, Examples 6 and 8 are formed respectively from white rice and brown rice while Examples 7 and 9 are formed respectively from clarified white rice and clarified brown rice.

TABLE 2

Composition of Rice Hydrolysates

| Analysis ↓ | Ex. 6 | Ex. 7 | Ex. 8 | Ex. 9 |
|---|---|---|---|---|
| Water | 21.1 | 20.6 | 21.0 | 20.9 |
| Fat | 0.6 | 0.2 | 1.8 | 0.4 |
| Protein | 0.7 | 0.8 | 0.9 | 1.1 |
| Ash | 0.6 | 0.4 | 0.7 | 0.6 |
| Carbohydrate | 77 | 78 | 76 | 77 |
| Hydrolysate Source | White Rice | Clarified White Rice | Brown Rice | Clarified Brown Rice |

Tables 1 and 2, in combination, illustrate a wide variety of hydrolyzed starches formed from rice or rice syrups all formed in accordance with the United States patents indicated above. Furthermore, all of the starch hydrolysates represented by Examples 1–9 in Tables 1 and 2 are characteristic of commercially available products available from California Natural Products, Manteca, California as are Examples 10–12 set forth below in Table 3.

Combinations of Examples 1–5 and 6–9 respectively from Tables 1 and 2 provide a variety of suitable rice hydrolysate alternatives, all of which are acceptable. For example, a rice hydrolysate having a DE according to the invention may be made from white, brown, clarified or unclarified. It is also understood that any combination of rice source (such as white with brown) or any rice hydrolysis having a carbohydrate profile different from the above but having a DE in the range of 40 to 70 would be suitable for the fruit sweetener composition.

As noted above, Table 3 includes Examples 10–12 representing grain syrups formed from rice as in Examples 1–9 and further formed entirely with normally non-allergenic enzymes as also discussed above. The enzymes set forth below in Table 3 were either disclosed in the two United States patents discussed above, or are capable of use in enzymatic processes in the same manner disclosed in that patent.

TABLE 3

Saccharification Enzymes for Rice Hydrolysates

| Analysis ↓ | Ex. 10 | Ex. 11 | Ex. 12 | Ex. 13 |
|---|---|---|---|---|
| Liquefaction Enzyme | *Bacillus subtilis, Bacillus licheniformis* and *Bacillus stearothermophilus* | | | |

TABLE 3-continued

Saccharification Enzymes for Rice Hydrolysates

| Analysis ↓ | Ex. 10 | Ex. 11 | Ex. 12 | Ex. 13 |
|---|---|---|---|---|
| Saccharification enzyme | *Bacillus subtilis* | *Aspergillus niger* | *oryzae* | *Rhizopus oryzae* |

Examples 10–13 of Table 3 thus represent enzyme systems suitable for use with any of the rice syrups or starch hydrolysates of Tables 1 and 2. In that regard, it is to be noted that all of the enzymes contemplated for use in the liquefaction step are microorganisms which are normally non-allergenic. However, as was noted above, it has been common practice to employ beta-amylase enzymes extracted from grains such as barley, wheat, etc. in the saccharification step for such starch hydrolysates. Examples 10–13 of Table 3 indicate the preferred use of microbial enzymes in the saccharification step so that the entire enzyme systems in Examples 10–13 are suitable for normally non-allergenic applications.

The non-allergenic nature of the enzyme systems of Examples 10–13 is particularly important in connection with rice being used as the grain source for all of Examples 1–9. Accordingly, by selecting the starch hydrolysate or grain syrup from combinations of Examples 1–13, both the source for the starch hydrolysate and the enzymes for carrying out the hydrolysis both result in a normally non-allergenic product.

Table 4 represents starch hydrolysates formed from yet another grain source, namely corn. The corn hydrolysates illustrated in Examples 14–18 of Table 4 are commercially available from Staley Industrial Products under the respective trade names or trademarks including STALEY 1300, NETO®7300, NETO®7350, STALEY 2300 and SWEETOSE®4300.

TABLE 4

Characteristics of Corn Hydrolysates

| | Ex. 14 | Ex. 15 | Ex. 16 | Ex. 17 | Ex. 18 |
|---|---|---|---|---|---|
| Representative carbohydrate composition ↓ | | | | | |
| Degree of Conversion | regular | regular | intermediate | intermediate | high |
| Type of Conversion | acid | acid-enzyme | acid-enzyme | acid | acid-enzyme |
| Dextrose Equiv. (D.E.), % | 43 | 44 | 50 | 54 | 54 |
| Dextrose (Monosaccharides), % | 22 | 7 | 8 | 27 | 40 |
| Maltose (Trisaccharides), % | 16 | 36 | 44 | 24 | 28 |
| Maltotriose (Trisaccharides), % | 14 | 25 | 23 | 15 | 10 |
| Higher Saccharides, % | 48 | 32 | 25 | 34 | 22 |
| Representative Chemical and Physical Data | | | | | |
| Baume at 100° F., degrees | 43 | 43 | 43 | 43 | 43 |

TABLE 4-continued

Characteristics of Corn Hydrolysates

| | Example → | | | | |
|---|---|---|---|---|---|
| | Ex. 14 | Ex. 15 | Ex. 16 | Ex. 17 | Ex. 18 |
| Total Solids, % | 80.5 | 80.5 | 80.7 | 81.0 | 81.8 |
| Moisture, % | 19.5 | 19.5 | 19.3 | 19.0 | 18.2 |
| pH | 4.7 | 4.7 | 4.7 | 4.7 | 4.7 |
| Viscosity, Poises at 100° F. | 125 | 125 | 90 | 75 | 55 |
| Boiling Point, °F. | 227 | 227 | 228 | 229 | 233 |
| Weight, lbs./gal. at 100° F. | 11.81 | 11.81 | 11.81 | 11.81 | 11.81 |

The grain syrups represented by the corn hydrolysates of Examples 4–18 represent an alternative to the rice hydrolysates of Examples 1–13. The carbohydrate profile for Examples 14–18 is set forth in Table 4 to indicate suitability of those examples for the sweetener composition of the present invention. However, even though the corn hydrolysates of Table 4 may be suitable in the sweetener composition of the present invention, they may be less preferable due to their residual sulfite content, thus introduction an allergenic factor, and the lack of detectable protein or fat in Examples 14–18. In that regard, the corn hydrolysates of Examples 14–18 vary from the corresponding characteristics described above for the rice hydrolysate examples 1–13. As was also noted above, the syrup or hydrolysate may also be formed from other starch sources.

The following Examples 19–23 illustrate a variety of fruit concentrate components formed in accordance with U.S. Pat. No. 4,873,112 as described above. The resulting characteristics for the fruit concentrate components of Examples 19–23 are set forth below in Table 5.

TABLE 5

Simple Carbohydrate Content and Other Characteristics for Fruit or Fruit Juice Concentrates

| Products Source | Conc. (% soluble solids) | Glucose | Fructose | Sucrose | Sorbitol |
|---|---|---|---|---|---|
| Ex. 19 - Apple | 64% | 31 | 62 | 5 | 2 |
| Ex. 20 - Pear | 64% | 20 | 60 | 5 | 15 |
| Ex. 21 - Pineapple | 64% | 25 | 25 | 50 | — |
| Ex. 22 - Orange | 64% | 49 | 49 | 2 | — |
| Ex. 23 - White Grape | 64% | 48 | 48 | 4 | — |

Thus, Examples 19–23 in Table 5 represent the availability of a fruit concentrate for the sweetener composition of the present invention from a variety of fruit. Preferably, the fruit concentrates in each of Examples 19–23, prior to blending and concentration as described below to form the sweetener composition of the invention, are initially adjusted to a pH of about 4.5–7, preferably about 4.5–5.5 in order to control naturally occurring ranges of acidity of the fruit concentrates.

EXAMPLE 24

Example 24 is a composite blended sweetener composition formed from a combination of a grain syrup or hydrolysate from a Examples 1–18 and a fruit or fruit juice concentrate selected from Examples 19–23. It is initially important to note that these combinations of examples are only representative of the invention and a wide variety of other combinations of starch hydrolysates or grain syrups and fruit or fruit juice concentrates could be employed in accordance with the present invention.

Example 24 particularly contemplates a sweetener composition formed by combining approximately equal parts of a grain syrup selected according to Examples 4, 7 and 11 and a fruit concentrate selected specifically as Example 23. In that regard, the grain syrup is formed from rice as a source grain since it is normally non-allergenic and hydrolyzed with an enzyme system which is also normally nonallergenic. The combination of this grain syrup thus forms a non-allergenic sweetener composition generally with any of the fruit concentrates of Examples 19–23 since they are all normally non-allergenic. However, Example 23 is preferred because of desirable characteristics for a fruit juice concentrate formed from white grapes.

Furthermore, all of Examples 1–23 represent commercially available products as noted above. In addition, the blended composition formed in Example 24 is then concentrated by water reduction in a manner disclosed for example, in U.S. Pat. No. 4,873,112, noted above and incorporated herein. However, the water removal or evaporation step is continued until the fruit concentrate sweetener is concentrated to at least about 77% soluble solids and more preferably to a liquid of about 77–80% soluble solids to form a preferred sweetener composition according to the present invention.

However, it is again to be noted that a wide variety of sweetener compositions is contemplated by the present invention and particularly within Example 24.

As noted above, the fruit concentrate, either a fruit juice concentrate or fruit syrup concentrate, for example, is preferably substantially clear, corresponding with the additional requirement that both the fruit concentrate and the resulting sweetener composition have approximately 0% insoluble solids. In that regard, the term "approximately 0% insoluble solids" in accordance with the present invention is intended to include compositions having insoluble solids, from the fruit or fruit juice, of about 0–2.0%, and preferably about 0–0.5%.

These examples further illustrate that the preferred form of the that concentrate, upon combination with the hydrolyzed starch component, can also facilitate deflavorization and other characteristics of the resulting composition.

More preferably, the resulting sweetener composition is also seen to preferably include natural nutritional components from the fruit concentrate.

EXAMPLE 25

Example 25 contemplates formation of a sweetener composition according to the present invention by synthesis wherein the component parts of the sweetener composition, particularly the simple carbohydrates and complex carbohydrates, are produced specifically from natural sources.

Typically, a simple carbohydrate such as fructose is well known to be capable of production from corn for example by techniques well known to those skilled in the art. Similarly, other components of the composition, including the various simple carbohydrates and complex carbohydrates, could also be produced from different or possibly combined natural sources similar to the production of fructose from corn.

It is again to be noted in connection with this example that the use of refined sugars has been found to be ineffective for replacing corresponding components of the composition. Rather, it is essential to synthesize substantially the same components of the composition, preferably from different or combined natural sources as noted above.

Examples 26–37 are set forth below to demonstrate various food/beverage formulations employing the sweetener composition of the present invention based on its dual functionality as a sweetener and fat replacement or substitute. In each of the following examples, a recipe or formulation is set forth employing the sweetener composition of the present invention and identified within the following examples as Liquid FRUITSOURCE® Plus Sweetener. It is also noted that a granular sweetener formed in accordance with U.S. Pat. No. 4,873,112 is also included within certain of the following examples and is identified as FRUITSOURCE® Granular Sweetener.

EXAMPLE 26

FRUIT JELLY ROLL 4 large eggs, at room temperature
½ cup FRUITSOURCE® Granular Sweetener
1½ tsp vanilla
1 tsp orange oil
½ tsp salt
¼ tsp cream of tartar
½ cup all purpose flour
1 cup sweetened jelly with 65% by wgt. Liquid FRUITSOURCE®Plus Sweetener
½ cup heavy cream (optional)

Use a cookie sheet with the dimensions approx. 14"×9". Butter the bottom of the pan. Place a sheet of wax paper on the bottom of the buttered cookie sheet. Butter and lightly flour the wax paper, shake off any excess flour. Pre. heat oven to 375 degrees.

In a large bowl mix together eggs, 1 teaspoon vanilla, orange oil, salt and cream of tartar until very frothy. While mixing on low speed add a little at a time of the flour and FRUITSOURCE® Granular Sweetener. Mix on medium speed for approx. 4 minutes.

Pour the batter into the pan, spread evenly with a spatula, and bake in the middle of the oven for approx 10 to 15 minutes or until the cake has pulled away from the sides and is clean with a small test in the center of the cake.

After removing the cake from the oven, lightly dust the cake with flour, place a sheet of wax paper over the cake and invert the cake onto the other piece of wax paper. Peel off the wax paper and trim away ⅛ of an inch of each side of the cake.

Spread ⅔ of the Liquid FRUITSOURCE® Sweetener sweetened jelly on top of the cake, once evenly spread, roll the cake starting from one end to the other, make sure that the finished roll has the lip on the bottom so it does not come unrolled.

In a bowl mix the ½ cup whip cream until it is almost reaching stiff peaks add the remaining ⅓ cup Liquid FRUITSOURCE® Plus Sweetener sweetened jelly or jam, and ½ teaspoon Vanilla, mix only until combined. Cover Jelly Roll with the whip cream and any desired fresh fruit and serve. Serves 8 1" thick pieces.

Original Recipe 4 eggs
½ cup sugar
1 tsp vanilla
1 tbl orange rind
½ tsp salt
⅛ tsp cream of tartar
½ cup flour
1 cup jam
⅔ cup heavy cream
3 tbls confectioners sugar DISCUSSION—The Recipe of Example 26, using the composition of the present invention is compared below with the product of the original recipe set forth immediately above:

(1) Replacement of all sucrose by Liquid FRUITSOURCE® Plus Sweetener and FRUITSOURCE® Granular Sweetener;

(2) Reduction in fat by a minimum of 24% and an option to remove (3) Sweetness of product matches original recipe; and 95%;

(4) Mouthfeel and texture same or superior to full fat product.

EXAMPLE 27

APRICOT ALMOND COFFEECAKE

FOR CAKE
½ cup butter
2 eggs, lightly beaten
1 cup Liquid FRUITSOURCE® Plus Sweetener
1 tsp vanilla
½ tsp cinnamon
1 tsp baking soda
1 tsp baking powder
¼ tsp salt
2 cups unsifted flour FOR FILLING AND TOPPING
1 Tbl Liquid FRUITSOURCE® Plus Sweetener
2 Tbl cinnamon
1 cup chopped dried apricots
½ cup blanched almonds FOR SIMPLE SYRUP
½ cup Liquid FRUITSOURCE® Plus Sweetener
1 tsp orange extract
¼ tsp ground clove
¼ tsp allspice Preheat oven to 325 degrees. Butter and Flour 8×8 cooking pan.

In a large bowl cream the butter. Add the eggs, Liquid FRUITSOURCE® Plus Sweetener liquid sweetener, vanilla and 1 tsp cinnamon. Mix thoroughly. Add slowly the flour, baking soda, baking powder and salt. Mix for two minutes on medium speed.

Pour ¾ of the batter into a baking pan, spread it all out evenly. Sprinkle 1 tbl of cinnamon, ½ cup apricots, ¼ cup almonds over the top of the batter. Pour the remaining batter. Spread as much as possible without disturbing the lower layer. Sprinkle the remaining cinnamon, apricots and almonds over the top. Drizzle 1 tablespoon of the liquid sweetener over the top of the cake. Place in center of oven and cook for approx. 40 minutes or until golden brown.

Warm up the simple syrup on the stove for 1 minute. Drizzle with a spoon over the top of the cake until there is no more syrup. Cut and eat.

Original Recipe. Cake and Topping 1 cup butter
2 eggs
1¼ cup sugar
⅓ cup +½ tsp cinnamon
1¼ cup milk
4 tsp baking soda
½ tsp salt
2 ½ cups flour DISCUSSION—The Recipe of Example 27, using the composition of the present invention is compared below with the product of the original recipe set forth immediately above:

(1) Replacement of all sucrose by Liquid FRUITSOURCE® Plus Sweetener;
(2) Reduction in fat by 52%;
(3) Reduction in free water in the cake portion by 79% resulting in an overall reduction in cooking time;
(4) Sweetness of product matches original recipe; and
(5) Mouthfeel and texture same or superior to full fat product.

EXAMPLE 28

CARROT CAKE

1½ cup Liquid FRUITSOURCE® Plus Sweetener
4 eggs lightly beaten
2 tsp baking soda
1 tsp salt
1 tbl cinnamon
1 tsp allspice
2⅓ cup flour
4 cups grated carrots
½ cup raisins (optional)
½ cup chopped walnuts (optional)

Preheat oven to 325 degrees. Grease baking pan.

Mix in a large bowl the eggs and the Liquid FRUITSOURCE® Plus Sweetener for approx. 2 minutes. Add into the bowl, cinnamon, allspice, baking soda and salt, slowly add the flour. Mix for 2 minutes, then add the carrots, walnuts and raisins. Pour the batter into the baking pan and place in the middle of the oven. Cook for approx. 40 minutes or until golden brown and the tester comes out of the middle of the cake clean.

Original Recipe 2 cups sugar
4 eggs
2 tsp baking soda
1 tsp salt
1 tbl cinnamon
pinch allspice
1 cup vege oil
2 cups flour
4 cups carrots DISCUSSION—The Recipe of Example 28, using the composition of the present invention is compared below with the product of the original recipe set forth immediately above:

(1) Replacement of all sucrose by Liquid FRUITSOURCE® Plus Sweetener;
(2) 2. Reduction in fat by 95%;
(3) Sweetness of product matches original recipe; and
(4) Mouthfeel and texture same as or superior to full fat product.

EXAMPLE 29

FRESH APPLE MUFFINS 2 eggs, beaten
¼ cup shortening
2 cups raw, peeled, grated apple
2 tsp baking soda
¼ tsp salt
1 Tbl cinnamon
2 tsp allspice
2 cups Liquid FRUITSOURCE® Plus Sweetener
3½ cups unsifted all-purpose flour
½ cup chopped nuts (optional)

Preheat oven to 325 degrees.

Beat eggs together for approx 1 minute. Add shortening, beat for 1 minute. Add grated apples, baking soda, salt, cinnamon, allspice. Add ½ your flour slowly into mixer then add all the Liquid FRUITSOURCE® Plus Sweetener beat for 1 minute, then add the rest of the flour. Mix completely then add nuts if desired. Put in Muffin tins and bake for approximately 17 minutes. Makes 1½ dozen.

Original Recipe 2 eggs
½ cup shortening
2 cups raw apples
2 tsp baking soda
½ tsp salt
1 tsp cinnamon
1 tsp nutmeg
2 cups sugar
2 cups flour
½ cup nuts DISCUSSION—The Recipe of Example 29, using the composition of the present invention is compared below with the product of the original recipe set forth immediately above:

(1) Replacement of all sucrose by Liquid FRUITSOURCE® Plus Sweetener;
(2) Reduction in fat by 50%;
(3) Reduction in salt by 50%;
(4) Sweetness of product matches original recipe; and
(5) Mouthfeel and texture same as or superior to full fat product.

EXAMPLE 30

BISCOTTI

½ eggs

½ cup FRUITSOURCE® Granular Sweetener

½ cup melted butter

½ cup Liquid FRUITSOURCE® Plus Sweetener 1 tsp Vanilla 2 tsp Orange Oil 4 cups Unsifted Flour 3 tsp Baking Powder 1 cup nuts (Optional)

¾ cup FRUITSOURCE Semi-Sweet Chunks (Optional)

Mix all wet ingredients thoroughly. Mix all dry ingredients together add dry ingredients to wet ingredients slowly while mixing. Stir in nuts or FRUITSOURCE® Semi-Sweet Chunks if desired. Batter should be a little thicker than cookie dough. Make into two loaves approx. 4"×7". Bake in the middle of the oven at 325 degrees for approx 45 minutes. Wait 10 minutes. Cut into ½" slices. Place back on cookies sheet lying down. Bake for another 6 minutes turn and repeat for other side. Cool on rack.

Original Recipe 3 eggs

1½ cubes butter

1½ cup sugar

2½ tsp vanilla 2 tsp baking powder 3 cups flour

DISCUSSION—The Recipe of Example 30, using the composition of the present invention is compared below with the product of the original recipe set forth immediately above:

(1) Replacement of all sucrose by Liquid FRUITSOURCE® Plus Sweetener;

(2) Reduction in fat by 40%;

(3) Sweetness of product matches original recipe; and (4) Mouthfeel and texture the same as or superior to full fat product.

EXAMPLE 31

BAKLAVA 25-13"×9" sheets Phyllo Dough

1½ cube Butter, melted

¾ cup FRUITSOURCE® Granular Sweetener 2 tbls Cinnamon

1½ tsp Clove, ground

1½ cup Almonds, Chopped

For the syrup

¼ cup Water

¾ cup Liquid FRUITSOURCE® Plus Sweetener 1 tsp Cinnamon

¼ tsp Cloves, ground 1 tsp Orange oil 1 tsp Lemon oil

Preheat oven to 300 degrees.

Place 5 sheets of Phyllo dough in a large glass baking dish. Brush the Phyllo dough with melted butter or margarine until covered. In a bowl combine the FRUITSOURCE® Granular Sweetener, almonds, cinnamon and ground clove mix well. Spread approximately ¼ of the mixture over the phyllo dough, place 5 more sheets of phyllo dough on top brush with melted butter or margarine and spread another ¼ of nut mixture on top. Repeat process until all the phyllo dough and nut mixture is gone. Making sure that the top layer is coated as well.

Bake the baklava in the middle of the oven for 20 minutes. Reduce the temperature to 250 degrees and bake the baklava for 45 minutes more. Let the baklava cool on a baking rack for 30 minutes. Slice baklava and place on baking rack placing foil underneath baking rack to catch leftover syrup.

In a saucepan combine the water, the Liquid FRUITSOURCE® Plus Sweetener, cinnamon, cloves, orange and lemon oil. Bring the mixture to a boil and simmer for 20 minutes stirring occasionally, be careful not to burn mixture.

Pour the hot syrup over the cooled baklava, repeat process with remaining syrup 3–4 times until baklava is well coated. Serve hot or cold.

Makes approximately 12–15 squares.

Original Recipe 25 sheets phyllo 3 cubes butter 5 tbls sugar 1 tsp cinnamon pinch cloves 1 lb walnuts For the Syrup 3½ cups water 2 cups sugar 1 cup honey 1 tsp lemon juice 3 org slices 3 lemon slices 1 cinnamon stick 4 whole cloves DISCUSSION—The Recipe of Example 31, using the composition of the present invention is compared below with the product of the original recipe set forth immediately above:

(2) Replacement of all Sucrose and Honey with Liquid FRUITSOURCE® Plus Sweetener and FRUITSOURCE® Granular Sweetener;

(2) Reduction in fat by 50%;

(3) Reduction in amount of free water in the syrup system by 71.4% resulting in an overall reduction in cooking time;

(4) Sweetness of product matches that of the original recipe; and (5) Mouthfeel and texture the same as or superior to full fat product.

EXAMPLE 32

MOLASSES COOKIES 1 egg white

¾ cup Liquid FRUITSOURCE® Plus Sweetener

½ cup Dark unsulfured molasses

2 Tbl Allspice 2 tsp Baking Soda

½ tsp Salt

2¾ All-Purpose Flour

Preheat oven to 325 degrees.

Mix all the wet ingredients together, beat for 1 minute. Add allspice, soda and salt. Mix flour in slowly, beat until mixing is complete. Let cookie dough chill for 2 hours in refrigerator. When dough is completely chilled spoon out dough on a cookie sheet and bake for approximately 12 minutes.

Original Recipe 1 egg 1 cup sugar

¾ cup shortening

½ cup molasses 2 tsp baking soda

½ tsp salt

½ tsp cloves

½ tsp cinnamon 1 tsp ginger

2½ cups flour

DISCUSSION—The recipe of Example 32. using the composition of the present invention, is compared below with the product of the original recipe set forth immediately above:

(1) Replacement of all sucrose with Liquid FRUIT-SOURCE® Plus Sweetener;

(2) Reduction in fat by 100%;

(3) Mouthfeel and texture same or superior to full fat product; and (4) Sweetness of FRUITSOURCE® product same as original recipe.

EXAMPLE 33

COUNTRY ZUCCHINI BREAD

¼ cup Butter (Creamed)

2½ cups Liquid FRUITSOURCE® Plus Sweetener 4 eggs beaten 2 cups zucchini Grated

¼ cup water e¾ cup flour

½ tsp baking powder 2 tsp baking soda 1 tsp salt 2 tsp cinnamon 2 tsp allspice 1 cup black walnuts ⅔ cup raisins Preheat oven to 300 degrees. Cream Butter and eggs and beat. Mix in Liquid FRUITSOURCE® Plus Sweetener, water and Spices. Beat for 2 minutes or until thoroughly combined. Add the rest of the dry ingredients mix thoroughly. Add the grated zucchini, nuts and raisins. Place in two loaf pans each half full. Place in the center of the oven and cook for approx. 50 minutes or until test toothpick shows ready. Cool on a rack.

Original Recipe

¾ cup shortening

2½ cups sugar 4 eggs 2 cups zucchini

⅔ cup water

3½ culls flour

½ tsp baking powder 2 tsp baking soda 1 tsp salt 1 tsp cinnamon 1 tsp allspice 1 cup black walnuts ⅔ cup raisins DISCUSSION—The recipe of Example 33, using the composition of the present invention, is compared below with the product of the original recipe set forth immediately above:

(1) Replacement of all sucrose by Liquid FRUITSOURCE® Plus Sweetener;

(2) Reduction in fat by 73%;

(3) Mouthfeel and texture same as or superior to the full fat product; and (4) Sweetness the same as the original recipe.

EXAMPLE 34

FAT FREE OATMEAL RAISIN COOKIES 2 large egg whites, beaten 1 cup Liquid FRUITSOURCE® Plus Sweetener 2 tsp vanilla 1 tsp Cinnamon 1 tsp Allspice 1 tsp Baking Soda 1 tsp Baking Powder ¼ tsp Salt 1½ cup All purpose Flour ½ cup FRUITSOURCE® Granular Sweetener 3 cups quick cooking oats 2 cups Raisins Preheat oven to 325 degrees.

Beat eggs in mixer for 1 minute. Add Liquid FRUITSOURCE® Plus Sweetener, beat for another 3 minutes until almost whipped appearance. Add Vanilla, Cinnamon, Allspice, Baking Soda, Baking Powder and Salt, beat for 2 minutes. Add Flour and Granular FRUITSOURCE beat for 1 minute. Add cooking oats beat for 1 minute. Add the raisins beat for 1 minute.

Bake in oven on ungreased cookie sheet for 10–12 minutes at 325 degrees. Makes approx 2 dozen cookies.

Original Recipe

¾ butter 1 cup brown sugar

¼ cup sugar 2 eggs 1 tsp vanilla 1 cup flour

½ tsp baking soda

½ tsp cinnamon

¼ tsp salt

¼ tsp nutmeg

2 ½ oats 1 cup raisins

DISCUSSION—The recipe of Example 34, using the composition of the present invention, is compared below with the product of the original recipe set forth immediately above:

(1) Replacement of all sucrose by Liquid FRUIT-SOURCE® Plus Sweetener and FRUITSOURCE® Granular Sweetener;

(2) Reduction in fat by 100%;

(3) Sweetness the same as original recipe; and (4) Mouthfeel and texture same as or better than full fat product.

DISCUSSION OF EXAMPLES 33–35:—The products prepared from the recipes of Examples 32–34 compared with the products of the respective original recipes in a generally similar manner as described above for Examples 26–31.

EXAMPLE 35

CARBONATED BEVERAGE

| Ingredients | |
|---|---|
| Carbonated water | 86% |
| Liquid FRUITSOURCE ® Plus Sweetener | 12% |
| Citric acid | .75% |
| Sodium Benzoate | .50% |
| Natural Flavors | .50% |
| Natural & artificial colors | .25% |

This example is a carbonated beverage prepared simply by combining the above ingredients in a mariner conventional for such beverage products.

| Original Recipe | |
|---|---|
| Carbonated water | 85% |
| High fructose corn syrup or sugar | 12.50% |
| Citric acid | .75% |
| Sodium Benzoate | .50% |
| Food starch | .50% |
| Natural Flavors | .50% |
| Natural & artificial colors | .25% |

DISCUSSION—In this example, the sweetener composition of the present invention primarily provides the benefit of sweetening the beverage in place of high fructose corn syrup and/or sugar as employed in the original recipe. Example 35 further demonstrates additional benefits such as desirable mouthfeel in the beverage resulting from use of the sweetener composition of the invention. The recipe of Example 35, using the composition of the present invention, is compared below with the product of the original recipe set forth immediately above:

(1) Replacement of all sweetener by Liquid FRUIT-SOURCE® Plus Sweetener;

(2) Sweetness substantially the same as the original recipe; and (3) The flavor comes through better or is more perceptible in the product formulated with Liquid FRUIT-SOURCE® Plus Sweetener.

EXAMPLE 36

CARAMEL

| Ingredients | |
|---|---|
| Liquid FRUITSOURCE ® Plus Sweetener | 60% |
| FRUITSOURCE ® Granular Sweetener | 31% |
| Butter | 8.4% |
| Salt | .40% |
| Gelatine | .20% |

The ingredients or the caramel sauce are also prepared by conventionally combining the above ingredients.

| Original Recipe | |
|---|---|
| Sugar | 19.3% |
| Corn syrup | 19.3% |
| 20% fat, cream | 50.0% |
| Powdered cream | 2.4% |
| Butter | 8.4% |
| Salt | .40% |
| Gelatine | .20% |

DISCUSSION:—Use of the sweetener composition of the present invention in the caramel sauce of Example 36 resulted in at least equivalent sweetening compared to the sugar and corn syrup employed in the original recipe and substantial reduction or substitution for fat in the original recipe provided by the 20% fat, cream and powdered cream. In addition to providing at least equal sweetness, the sweetener composition of the present invention also provided additional benefits including superior mouthfeel, etc. The recipe of Example 36, using the composition of the present invention, is further compared below with the product of the original recipe set forth immediately above:

(1) Replacement of all "sugars" with Liquid FRUIT-SOURCE® Plus Sweetener;

(2) Reduction in fat by 12.4%;

(3) Mouthfeel and texture at least equal to or superior to the product of the original recipe with full fat content;

(4) Sweetness at least the same as the product from the original recipe; and (5) The product made with the Liquid FRUITSOURCE® Plus Sweetener of the invention does not grain off or surface grain.

EXAMPLE 37

SPORTS NUTRITION DRINK

| Water | 85% |
|---|---|
| Liquid FRUITSOURCE Plus Sweetener | 11% |
| Whey Protein Isolate | 2% |
| Vitamin and mineral blend | .5% |
| Flavor | .5% |
| Lecithin | .25% |
| Emulsification system | .25% |
| Citric acid | .25% |
| Sodium benzoate | .25% |

DISCUSSION—The beverage formulation of Example 37 is not based upon an original recipe containing different sweeteners or "sugars". However, the product of Example 37 demonstrates similar benefits as the beverage product of Example 35.

Examples 26–37 demonstrate use of the sweetener composition in a variety of food and beverage products based upon the multi-functionality of the sweetener composition and more particularly upon its dual functionality as a sweetener and fat replacement or substitute. It is also apparent from Examples 26–37 that additional food and beverage products can readily be formed in a similar manner with the fruit concentrate composition of the present invention including, for example, other pastries, baked goods and various sweetened prepared foods as well as a variety of beverages. Accordingly, Examples 26–37 are further illustrative of use of the fruit concentrate composition or sweetener of the present invention in a wide variety of other food/beverage products including but not limited to baked goods, confections, granola bars, fruit bars, sweetened breakfast cereals, sauces, salad dressings, sports nutrition beverages, curing agents for meats and dough conditioners.

Studies were conducted to further determine and demonstrate benefits and functionalities of the sweetener composition of the present invention compared with prior art sweeteners such as refined sugars generally matching the carbohydrate profile of the invention as well as a mixture of a grape juice concentrate and rice syrup also matching the carbohydrate profile and quantity of the sweetener composition of the present invention.

The refined sugars were blended in dry form with substantially a similar character or profile for carbohydrates, both simple and complex. Soluble solids of about 100% were assured and sufficient water was added to reduce the refined sugars to about 78% soluble solids, that is about 78 BRIX. Thus, essentially all of rite added water, about 22% by weight of the hydrated refined sugars, was present as free water, unlike the composition of the invention as defined above. The term "free water" is used in the present invention to include all water which is not bound water, that is, water which is physically and/or chemically bound (particularly with the simple or complex carbohydrates of the composition of the invention). The studied blend of grape juice concentrate and rice syrup was prepared with about equal parts of grape juice concentrate of about 62 BRIX and rice syrup of about 78 BRIX. The resulting blend was not concentrated to reduce water as taught for the present invention. Accordingly, the studied blend had concentrations of about 70 BRIX or about 70% soluble solids.

An initial study was conducted to determine if a mixture of refined sugars matching the carbohydrate profile and having the same water content as the composition of the invention, would provide the same functionality in baked goods as the composition of the invention. This study was conducted in baking applications where the invention composition served as the sweetener and as a full or partial fat replacer. The resulting products were compared organoleptically by a panel. The baked goods containing the equivalent in refined sugars and water were found to have a dryer texture, a "cloying" sweetness, and a sweetness level that approximated 50% of the sweetness of the baked good containing the fruit sweetener composition product. In addition, the baking properties of the products were different. The baking times for the refined sugar products were found to be longer and the apparent wheat flour cell structure was disturbed resulting in a baked good that did not rise correctly.

Another study was conducted to determine if a mixture of grape juice concentrate and rice syrup matching the carbohydrate profile and quantity of the invention could be used to provide the same functionality in baked goods as the FRUITSOURCE® composition of the invention. This study was conducted for baking applications where the invention composition served as the sweetener and as a full or partial fat replacer. The resulting products were compared organoleptically by a panel. The baked goods containing the equivalent in fruit juice concentrate/rice syrup were found to have a dryer texture, and a sweetness level that approximated 40% of the sweetness of the baked good containing the fruit sweetener composition product. In addition, the baking properties of the products were different. The baking times for the fruit concentrate/rice syrup products were found to be longer and burning occurred around the edges. Contrary to the refined sugar based baked goods above, the, product did hold the wheat flour cell structure but exhibited a layering effect of size and amount of these aeration cells as opposed to a desired uniform cell structure throughout. It was assumed that this cell structure unevenness was due to the excess moisture found in the fruit concentrate/rice syrup based baked goods which caused the cell structure to break down as the water settled to the bottom of the dough mix during the initial cooking process.

The above studies led to the conclusions that the composition of the invention, compared with the simple addition of its components, provided the desired functionality without compromising baking or organoleptic properties of the baked good. It was discovered that removal of the water from a blend of fruit concentrate and rice syrup and providing a homogeneous composition to a system or formula produced not only desired functionality but improved baking properties. Addition of corresponding amounts of refined sugar and water or fruit concentrate and rice syrup to a system formula, not only did not have the desired fat and sweetness functionality, but caused significant problems with baking and textural properties. The above results might be explained in terms that the composition of this invention has a lower water activity due to the removal of some of its water. This lower water activity makes it difficult for the other dry ingredients to "wet" themselves and therefore alters their baking and/or organoleptic properties.

Thus, there have been described above a number of embodiments of multi-functional compositions and corresponding processes which are considered to be encompassed by the present invention. However, although the preceding description and examples are illustrative of the invention, they are not to be taken as defining the scope of the invention. Rather, the scope of the invention is defined only by the following appended claims which are further illustrative or exemplary of the invention.

What is claimed is:

1. A fruit concentrate composition comprising a blend of a hydrolyzed starch having a dextrose equivalent of at least about 40 and a fruit concentrate having about 0% insoluble solids, the blended fruit concentrate composition having a sweetness at least about equal to sucrose, at least about 77% soluble solids, a dry weight composition of at least about 70% simple carbohydrates and about 3–20% complex carbohydrates, the hydrolyzed starch providing no more than about 60% of the simple carbohydrates, with a resulting dual functionality in food formulations for achieving both nutritive sweetening and fat substitution.

2. The composition of claim 1 wherein the blended fruit concentrate composition has about 80–95% simple carbohydrates and about 3–10% complex carbohydrates, both on a dry weight basis, with a resulting dual functionality in food formulations for achieving both nutritive sweetening and fat substitution.

3. The composition of claim 1 wherein the blended fruit concentrate composition has about 90–95% simple carbohydrates and about 6% complex carbohydrates, both on a dry weight basis, with a resulting dual functionality in food formulations for achieving both nutritive sweetening and fat substitution.

4. The composition of claim 3 wherein the hydrolyzed starch has a dextrose equivalent of about 50–70.

5. The composition of claim 1 wherein the blended composition is a liquid comprising about 77–80% soluble solids.

6. The composition of claim 1 wherein the hydrolyzed starch has a dextrose equivalent of about 50–70.

7. The composition of claim 1 wherein the blended composition has a maximum water activity of about 0.68.

8. The composition of claim 1 wherein the simple carbohydrates are selected from the class consisting of glucose, maltose, fructose, sucrose, lactose, sorbitol and combinations thereof, the complex carbohydrates comprising one or more dextrins.

9. The composition of claim 8 wherein at least one of the simple carbohydrates is selected to have humectant properties in order to enhance dual functionality of the blended fruit concentrate composition as a sweetener and fat substitute.

10. The composition of claim 8 wherein the hydrolyzed starch provides no more than about 50% of the simple carbohydrates.

11. The composition of claim 1 wherein at least one of the simple carbohydrates are selected to have humectant properties in order to enhance dual functionality of the blended fruit concentrate composition as a sweetener and fat substitute.

12. The composition of claim 1 wherein the hydrolyzed starch is normally non-allergenic and wherein hydrolysis of the starch is carried out enzymatically by a normally nonoallergenic enzyme or enzymes in order that all components of the blended fruit concentrate composition are non-allergenic.

13. The composition of claim 12 wherein the starch is rice.

14. The composition of claim 12 wherein the fruit concentrate is commercially available and comprised of fructose, glucose, sucrose or sorbitol or any combination thereof.

15. The composition of claim 1 wherein the fruit concentrate is commercially available and comprised of fructose, glucose, sucrose or sorbitol or any combination thereof.

16. The composition of claim 1 wherein at least about 50% of the simple carbohydrates are provided by the fruit concentrate.

17. The composition of claim 1 wherein at least a portion of the simple carbohydrates are provided by another component in addition to the hydrolyzed starch and fruit concentrate.

18. A method of forming a fruit concentrate composition, comprising the steps of:
  (a) blending a hydrolyzed starch having a dextrose equivalent of at least about 40 with a fruit concentrate having about 0% insoluble solids, the blended fruit concentrate composition having a sweetness at least about equal to sucrose, a dry weight composition of at least about 70% simple carbohydrates and about 3–20% complex carbohydrates, the hydrolyzed starch providing no more than about 60% of the simple carbohydrates;
  (b) reducing the water content of the blended fruit concentrate composition to at least about 77% soluble solids (77 Brix) whereby the blended fruit concentrate composition is stable and has a resulting dual functionality in food formulations for achieving both nutritive sweetening and fat substitution.

19. The method of claim 18 wherein the simple carbohydrates are selected from the class consisting of glucose, maltose, fructose, sucrose, lactose sorbitol and combinations thereof, the complex carbohydrates comprising one or more dextrins.

20. The method of claim 18 wherein the hydrolyzed starch is a grain syrup and the fruit concentrate is a grape juice concentrate.

21. The method of claim 18 wherein the blended fruit concentrate composition has about 80–95% simple carbohydrates and about 3–10% complex carbohydrates, both on a dry weight basis.

22. The method of claim 18 wherein the blended fruit concentrate composition has about 90–95% simple carbohydrates and about 6% complex carbohydrates, both on a dry weight basis.

23. The method of claim 18 wherein the hydrolyzed starch has a dextrose equivalent of about 50–70.

24. The method of claim 18 wherein the blended composition has maximum water activity of about 0.68.

25. The method of claim 18 wherein the hydrolyzed starch provides no more than about 50% of the simple carbohydrates.

26. The method of claim 18 wherein the hydrolyzed starch is nonallergenic and wherein hydrolysis of the starch is carded out enzymatically by a nonallergenic enzyme or enzymes in order that all components of the blended fruit concentrate composition are non-allergenic.

27. The method of claim 18 wherein at least about 50% of the simple carbohydrates are provided by the fruit concentrate.

28. The method of claim 18 wherein at least a portion of the simple carbohydrates are provided by another component in addition to the hydrolyzed starch and fruit concentrate.

29. The method of claim 26 wherein the starch is rice and the fruit concentrate is commercially available and comprised of fructose, glucose, sucrose or sorbitol or any combination thereof.

30. The product of the method of claim 29.

31. The product of the method of claim 26.

32. The product of the method of claim 24.

33. The product of the method of claim 21.

34. The product of the method of claim 18.

35. A food/beverage product including a fruit concentrate composition comprising a blend of a hydrolyzed starch having a dextrose equivalent of at least about 40 and a fruit concentrate having about 0% insoluble solids, the blended fruit concentrate composition having a sweetness at least about equal to sucrose, at least about 77% soluble solids, a dry weight composition of at least about 70% simple carbohydrates and about 3–20% complex carbohydrates, the hydrolyzed starch providing no more than about 60% of the simple carbohydrates, with a resulting dual functionality in food formulations for achieving both nutritive sweetening and fat substitution.

36. The food/beverage product of claim 35 wherein the blended fruit concentrate composition has about 80–95% simple carbohydrates and about 3–10% complex carbohydrates, both on a dry weight basis, with a resulting dual functionality in food formulations for achieving both nutritive sweetening and fat substitution.

37. The food/beverage product of claim 35 wherein the blended fruit concentrate composition has about 90–95% simple carbohydrates and about 6% complex carbohydrates, both on a dry weight basis, with a resulting dual functionality in food formulations for achieving both nutritive sweetening and fat substitution.

38. The food/beverage product of claim 35 wherein the blended composition has maximum water activity of about 0.68.

39. The food/beverage product of claim 35 wherein the simple carbohydrates are selected from the class consisting of glucose, maltose, fructose, sucrose, lactose, sorbitol and combinations thereof, the complex carbohydrates comprising one or more dextrins.

40. The food/beverage product of claim 35 wherein the hydrolyzed starch provides no more than about 50% of the simple carbohydrates.

41. The food/beverage product of claim 35 wherein at least one of the simple carbohydrates is selected to have humectant properties in order to enhance dual functionality of the blended fruit concentrate composition as a sweetener and fat substitute.

42. The food/beverage product of claim 41 wherein the simple carbohydrates are selected from the class consisting of glucose, maltose, fructose, sucrose, lactose, sorbitol and combination thereof and the complex carbohydrates: are a combination of different dextrins.

43. The food/beverage product of claim 42 wherein the fruit concentrate is commercially available and comprised of fructose, glucose, sucrose or sorbitol or any combination thereof.

44. The food/beverage product of claim 35 wherein at least about 50% of the simple carbohydrates are provided by the fruit concentrate.

45. The food/beverage product of claim 35 wherein at least a portion of the simple carbohydrates are provided by another component in addition to the hydrolyzed starch and fruit concentrate.

46. The food/beverage product of claim 35 wherein the hydrolyzed starch is non-allergenic and wherein hydrolysis of the starch is carried out enzymatically by a non-allergenic enzyme or enzymes in order that all components of the blended fruit concentrate composition are non-allergenic 47. The food/beverage product of claim 46 wherein the starch is rice.

48. The food/beverage product of claim 47 wherein the fruit concentrate is commercially available and comprised of fructose, glucose, sucrose or sorbitol or any combination thereof.

49. The food/beverage product of claim 35 wherein the food/beverage product is selected from the class consisting of baked goods, confections, granola bars, fruit bars, sweetened breakfast cereals, sauces, salad dressings, sports nutrition beverages, curing agents for meats and dough conditioners.

50. The food/beverage product of claim 35 wherein the fruit concentrate composition provides substantial sweetening for the food/beverage product while replacing at least 25% of normal fat components therein.

51. The food/beverage product of claim 35 wherein the fruit concentrate composition provides substantial sweetening for the food/beverage product while replacing at least 50% of normal fat components therein.

52. The food/beverage product of claim 35 wherein the fruit concentrate composition provides substantial sweetening for the food/beverage product while replacing substantially all of normal fat components therein.

53. A method of providing sweetness and fat substitution in food/beverage products comprising the step of replacing at least a portion of normal sweeteners and fat components with a fruit concentrate composition comprising a blend of a hydrolyzed starch having a dextrose equivalent of at least about 40 and a fruit concentrate having about 0% insoluble solids, the blended fruit concentrate composition having a sweetness at least about equal to sucrose, at least about 77% soluble solids, a dry weight composition of at least about 70% simple carbohydrates and about 3–20% complex carbohydrates, the hydrolyzed starch providing no more than about 60% of the simple carbohydrates, with a resulting dual functionality in food formulations for achieving both nutritive sweetening and fat substitution.

54. The method of claim 53 wherein the blended fruit concentrate composition has about 80–95% simple carbohydrates and about 3–10% complex carbohydrates, both on a dry weight basis, with a resulting dual functionality in food formulations for achieving both nutritive sweetening and fat substitution.

55. The method of claim 53 Wherein the blended fruit concentrate composition has about 90–95% simple carbohydrates and about 6% complex carbohydrates, both on a dry weight basis.

56. The method of claim 53 wherein the blended composition has maximum water activity of about 0.68.

57. The method of claim 53 wherein the simple carbohydrates are selected from the class consisting of glucose, maltose, fructose, sucrose, lactose, sorbitol and combinations thereof, the complex carbohydrates comprising one or more dextrins.

58. The method of claim 57 wherein at least a substantial portion of the simple carbohydrates are selected to have humectant properties in order to enhance dual functionality of the blended fruit concentrate composition as a sweetener and fat substitute.

59. The method of claim 53 wherein the hydrolyzed starch provides no more than about 50% of the simple carbohydrates.

60. The method of claim 53 the hydrolyzed starch is non-allergenic and wherein hydrolysis of the starch is carded out enzymatically by a non-allergenic enzyme or enzymes in order that all components of the blended fruit concentrate composition are non-allergenic.

61. The method of claim 60 wherein the starch is rice.

62. The method of claim 61 wherein the fruit concentrate is commercially available and comprised of fructose, glucose, sucrose or sorbitol or any combination thereof.

63. The method of claim 53 wherein the food/beverage product is selected from the class consisting of baked goods, confections, granola bars, fruit bars, sweetened breakfast cereals, sauces, salad dressings, sports nutrition beverages, curing agents for meats and dough conditioners.

64. The method of claim 53 further comprising the steps of providing substantial sweetening in the food/beverage product with the fruit concentrate composition while simultaneously replacing at least about 25% of normal fat components in the food/beverage product with the fruit concentrate composition also employed for sweetening.

65. The method of claim 53 further comprising the steps of providing substantial sweetening in the food/beverage product with the fruit concentrate composition while simultaneously replacing at least about 50% of normal fat components in the food/beverage product with the fruit concentrate composition also employed for sweetening.

66. The method of claim 53 further comprising the steps of providing substantial sweetening in the food/beverage product with the fruit concentrate composition while simultaneously replacing substantially all of normal fat components in the food/beverage product with the fruit concentrate composition also employed for sweetening.

67. The method of claim 66 wherein at least about 50% of the simple carbohydrates are provided by the fruit concentrate.

68. The method of claim 66 wherein at least a portion of the simple carbohydrates are provided by another component in addition to the hydrolyzed starch and fruit concentrate.

* * * * *

UNITED STATES PATENT AND TRADEMARK OFFICE
CERTIFICATE OF CORRECTION

PATENT NO. : 5,492,715
DATED : February 20, 1996
INVENTOR(S) : Frederick A. Greenland, et al It is certified that error appears in the above-indentified patent and that said Letters Patent is hereby corrected as shown below:

Column 1, line 31, "DF 2" should be —DP 2—.
Column 2, line 54, "dram" should be —drum—.
Column 6, line 33, after "surface", ":" should be deleted.
Column 7, line 16, "frown" should be —from—.
Column 8, line 23, "(t)" should be —(f)—.
Column 9, line 48, "nonallergenic" should be —non-allergenic—.
Column 11, line 8, "carded" should be —carried—.
Column 11, line 48, "bait" should be —fruit—.
Column 13, line 62, "foraged" should be —formed—.
Column 14, line 5, "alphaamylase" should be —alpha-amylase—.
Column 14, line 37, after "where", ":" should be deleted.
Column 15, line 26, "Staphylococcus aurrus" should be italicized.
Column 16, line 14, "romping" should be —forming—.

UNITED STATES PATENT AND TRADEMARK OFFICE
CERTIFICATE OF CORRECTION

PATENT NO. : 5,492,715
DATED : February 20, 1995
INVENTOR(S) : Frederick A. Greenland, et al It is certified that error appears in the above-indentified patent and that said Letters Patent is hereby corrected as shown below:

Column 21, line 17, "4" should be —14—.
Column 24, line 19, "remove" should be —remove 95%—.
Column 24, line 21, "95%;" should be deleted.
Column 25, line 41, "2 1/3" should be —2 1/2—.

Column 27, line 5, "1/2" should be —2 1/2—.
Column 29, line 51, "e3/4" should be — 3 3/4—.
Column 30, line 8, "culls" should be —cups—.
Column 31, line 41, "mariner" should be —manner—.
Column 33, line 36, "rite" should be —the—.
Column 35, line 40, "non-oallergenic" should be —non-allergenic—.
Column 37, line 31, after "carbohydrates", ":" should be deleted.
Column 38, line 54, "carded" should be —carried—.

Signed and Sealed this

Twenty-third Day of July, 1996

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,492,715

DATED : February 20, 1996

INVENTOR(S) : Frederick A. Greenland, *et al.*

It is certified that error appears in the above-identified patent and that said Letters Patent is hereby corrected as shown below:

Column 26, line 7, after "(2)", "2." should be deleted.

Signed and Sealed this

First Day of October, 1996

*Attest:*

BRUCE LEHMAN

*Attesting Officer*  *Commissioner of Patents and Trademarks*